ELECTRONIC MAGNITUDE COMPARATOR

Filed Nov. 25, 1953 4 Sheets-Sheet 1

INVENTOR.
ROBERT ROYCE JOHNSON,
BY
Seymour M. Rosenberg
HIS ATTORNEY.

Aug. 18, 1959 R. R. JOHNSON 2,900,620

ELECTRONIC MAGNITUDE COMPARATOR

Filed Nov. 25, 1953 4 Sheets-Sheet 2

INVENTOR.
ROBERT ROYCE JOHNSON,
BY
Seymour M. Rosenberg
HIS ATTORNEY.

INVENTOR.
ROBERT ROYCE JOHNSON,
BY
Seymour M. Rosenberg
HIS ATTORNEY.

Aug. 18, 1959 R. R. JOHNSON 2,900,620

ELECTRONIC MAGNITUDE COMPARATOR

Filed Nov. 25, 1953 4 Sheets-Sheet 4

INVENTOR.

ROBERT ROYCE JOHNSON,

BY

Seymour M. Rosenberg

HIS ATTORNEY.

2,900,620

ELECTRONIC MAGNITUDE COMPARATOR

Robert Royce Johnson, Pasadena, Calif., assignor, by mesne assignments, to Hughes Aircraft Company, a corporation of Delaware Application November 25, 1953, Serial No. 394,441

17 Claims. (Cl. 340—149)

This invention relates to an electronic magnitude comparator, and more particularly to an electronic magnitude comparator for comparing and indicating the relative magnitudes of two numbers, represented as two sets of binary coded electrical digit signals, respectively, by comparing the relative magnitudes of corresponding digit signals.

In the past, comparison and indication of the relative magnitudes of two members represented as binary coded electrical digit signals has been accomplished by subtracting one number from the other number and indicating the sign or sense of the difference, or by subtracting one of the numbers from zero, adding the difference to the other number, and indicating the sign or sense of the sum. The mechanization of such an operation requires at least an adder or subtractor circuit, and a bistable element as an indicating device.

According to the present invention, a much simpler comparator may be used where the particular code in which the numbers are expressed is one having the property that the relative magnitudes of two numbers is indicated by the sense of the non-identity of the most significant dissimilar corresponding digits of the two numbers. As used herein, the most significant digit of a binary number, that is a number expressed in a binary code, is the digit to which the greatest absolute value of weight would be attached in deriving the decimal number equivalent of the binary number.

More particularly, the basic combination according to this invention comprises a single bistable element, means for switching the element to one of its stable states when corresponding digit signals are dissimilar in one sense, and means for switching the element to its other stable state when corresponding digit signals are dissimilar in the opposite sense. When this basic combination is utilized to compare two multi-digit numbers, the state of the bistable element at the completion of the comparison process indicates the relative magnitudes of the two numbers. The exact structure of the means associated with the bistable element for any particular embodiment of the present invention is shown to depend upon the particular code in which the two numbers being compared are expressed and upon the mode of application of the respective digits of the two numbers to the comparison device.

The basic combination of this invention is directly applicable to numbers expressed in a binary code having the property that the sense of the non-identity of the most significant dissimilar corresponding digits of the two numbers is a direct indication of the relative magnitudes of the two numbers. Among the more common codes in use at the present time which display this property are the positional binary code, the excess 0, 1, 2, 3, 4, 5, 6 binary codes, and various forms of the binary coded decimal code. Numbers expressed in a binary code having the property that the sense of the non-identity of the most significant dissimilar corresponding digits of the two numbers is a direct indication of the relative magnitudes of the two numbers will hereafter be referred to as "weighted binary numbers."

The basic combination is also applicable to binary coded number systems having the property that the significance of the sense of the non-identity of the most significant dissimilar corresponding digits, as an indication of the relative magnitudes of the two numbers, is a function of the number of similar corresponding "1" digits more significant than the most significant dissimilar digits. A code in use at the present time which displays this property is commonly referred to as a reflected binary code.

The basic combination of this invention is directly applicable to the comparison of two numbers expressed in either of the above codes where the signals representing corresponding digits of the two numbers being compared are supplied to the comparison device sequentially in time, in the order of least significant digit first, or most significant digit first. The basic combination is also directly applicable to the carrying out of the comparison process where all digit signals of the two numbers being compared are supplied simultaneously, or where a plurality of the digit signals are supplied simultaneously.

According to the present invention, optimum structure for the means associated with the bistable element for any particular embodiment of the present invention may be determined directly from basic Boolean equations which specify the desired result of the comparison process for a particular code and mode of application of the digit signals. There is shown in the present invention how such Boolean equations may be derived mathematically from Boolean equations which define conditions of relative magnitude for the particular code being considered. A procedure for mechanizing specific embodiments of the present invention from the resulting basic Boolean equations is disclosed and particular embodiments of the present invention, wherein a flip-flop is utilized as the bistable element, are illustrated.

It is, therefore, an object of the present invention to provide an electronic magnitude comparator for comparing and indicating the relative magnitudes of two binary digits expressed as bivalued electrical signals, respectively, which is simple, reliable and requires a minimum amount of power for its operation.

Another object of the present invention is to provide a system for comparing and indicating the relative magnitudes of two numbers represented as two sets of binary coded electrical digit signals, respectively, by comparing the relative magnitudes of corresponding digit signals.

A further object of the present invention is to provide an electronic magnitude comparator which sequentially compares corresponding digit signals of two sets of binary coded electrical digit signals representing two numbers, respectively, and instantaneously indicates the relative magnitudes of the two numbers.

It is also an object of the present invention to provide an electronic magnitude comparator for the simultaneous comparison of corresponding digit signals of two sets of binary coded electrical digit signals representing two numbers, respectively, instantaneously indicating the relative magnitudes of the two numbers.

A still further object of the present invention is to provide an electronic magnitude comparator for comparing and indicating the relative magnitudes of two numbers expressed as two pluralities of groups of binary coded electrical digit signals, respectively, by comparing in time sequence corresponding groups of digit signals and instantaneously indicating the relative magnitudes of the two numbers at the completion of the comparison operation.

It is yet another object of the present invention to provide an electronic magnitude comparator for comparing and indicating the relative magnitudes of two numbers expressed as two sets of binary coded electrical digit signals, respectively, wherein the comparison operation is discontinued once the relative magnitudes of the two numbers has been established.

The novel features which are believed to be characteristic of the invention, both as to its organization and method of operation, together with further objects and advantages thereof, will be better understood from the following description considered in connection with the accompanying drawings in which several embodiments of the invention are illustrated by ways of examples. It is to be expressly understood, however, that the drawings are for the purpose of illustration and description only, and are not intended as a definition of the limits of the invention.

Figure 1:
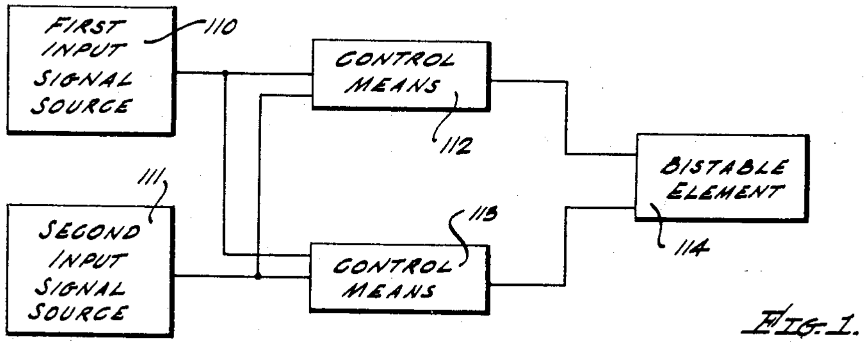
Figure 1 is a block diagram of the basic combination of the present invention.

Referring now to the drawings, in which like reference characters represent the same or equivalent elements in the several embodiments, there is shown in Figure 1 a block diagram of one embodiment of an electronic magnitude comparator according to the present invention for comparing two numbers expressed as two sets of binary coded electrical digit signals, respectively. The set of binary coded electrical signals representing a number may include a series of pulse signals wherein the presence of a pulse represents the binary digit 1, and the absence of a pulse represents the binary digit 0, or may be two-valued voltage level signals, wherein one voltage level represents the binary digit 1, and the other voltage level represents the binary digit 0.

As shown in Figure 1, the comparator includes a pair of input signal sources 110 and 111 for supplying input signals representing the two numbers, respectively, to a pair of control means 112 and 113, which in turn are connected to an electrical bistable element 114. Control means 112 is so arranged that, in response to a "1" input signal from source 110 and a "0" input signal from source 111, an output signal is applied to bistable element 114 to set the element to one of its stable states which may be designated the "1" state. On the other hand, control means 113 is responsive to a "0" input signal from source 110 and a "1" input signal from source 111, to apply an output signal to bistable element 114 to set the element to its other stable state, which may be desiganted the "0" state.

The comparator thus far described may be used to compare and indicate the relative magnitudes of two binary digits. For example, if the input signal applied to the system by source 110 is a "1" digit, and that applied by source 111 is a "0" digit, the bistable element will be set to its "1" state, while if the input signals are reversed, the bistable element will be set to its "0" state. If, in accordance with conventional practice, a "1" digit is considered to be of greater magnitude than a "0" digit, the state of the bistable element may be taken as a direct indication of the relative magnitudes of the two digits. A "1" state of the bistable element would then indicate that the number represented by the input signal from source 110 is of greater magnitude than that represented by the input signal from source 111, while a "0" state of the bistable element would indicate the contrawise, if the input signals are not identical.

It should be noted that if both input signals are either identical "1"'s or identical "0"'s, the bistable element is not triggered or switched and will remain in the state it was in prior to the application of the input signals. Therefore, one of the bistable states will represent both a condition of relative magnitude and a condition of identity between the applied input signals. Thus, under the mode of operation outlined above, if the bistable element is initially in its "0" state, and is in its "0" state following the application of the input signals, the input signal applied from source 111 is either greater than or equal to the signal applied from source 110. On the other hand, if the bistable element is in its "1" state following the application of the input signals, the input signal from source 111 is less than that applied from source 110. Similarly, if the bistable element is initially in its "1" state, and is in its "1" state following the application of the input signals, the input signal applied from source 110 is either greater than or equal to the input signal applied from source 111, while if the bistable element is in its "0" state following the application of the input signals, the input signal applied from source 110 is less than the input signal applied from source 111.

Before considering the specific embodiments of the invention which provide for the comparison of multi-digit numbers expressed in either the weighted binary or reflected binary code, basic Boolean equations which define the desired result of the comparison operation for numbers expressed in either of the codes will be derived. It will then be pointed out how such equations, by appropriate modification, yield equations which may be directly mechanized to form the various embodiments of the present invention.

As previously noted, when two numbers, expressed in a weighted binary code, are compared, the relative magnitudes of the two numbers will be determined by the sense of the most significant non-identical corresponding digits.

Where the non-identity occurs in the most significant or $n$th digit place of the two numbers, the relative magnitudes of the two numbers are determined by the sense of the non-identity. A non-identity occurring between the digits in the next most significant or $(n-1)$th digit place will be determinative of the relative magnitudes of the two numbers when the corresponding digits in the $n$th digit place are identical. Similarly, a non-identity occurring in the $j$th digit place will be determinative of the relative magnitudes of the two numbers when the corresponding digits in the $(j+1)$, $(j+2)$ . . . $(n-2)$, $(n-1)$, and $n$th digit places are each identical. It should be noted that there are two possible conditions of non-identity, depending on the sense of the non-identity, and that there are two possible conditions of identity, that is, identical "1" digits, or identical "0" digits.

The relations thus described may be more conveniently set forth and more readily mechanized if they are expressed as logical Boolean equations. If $A_j$ and $\bar{A}_j$ are used to denote the existence of a "1" digit or a "0" digit, respectively, in the $j$th digit place of the first number, and $B_j$ and $\bar{B}_j$ the existence of a "1" digit or a "0" digit, respectively, in the $j$th digit place of the second number, then for a nonidentity occurring in the most significant digit place:

$$A>B \text{ if } A_n\cdot\bar{B}_n=1 \quad (1)$$

$$A<B \text{ if } \bar{A}_n\cdot B_n=1 \quad (2)$$

where the equations are expressed in propositional logic, the symbol "." being the logical "and" connective, and the "=1" may be read as "exist," indicating occurrence, in a logical sense, of the values so connected. (Alternatively, "=0" may be read, "do not exist.")

Similarly, if the most significant nonidentity occurs in the next most significant, or $(n-1)$ digit place, then:

$$A>B \text{ if } (A_nB_n+\bar{A}_n\bar{B}_n)A_{n-1}\bar{B}_{n-1}=1 \quad (3)$$

$$A<B \text{ if } (A_nB_n+\bar{A}_n\bar{B}_n)\bar{A}_{n-1}B_{n-1}=1 \quad (4)$$

where the "+" symbol is the logical "or" connective, indicating that the condition is satisfied by the existence of either of the values so joined, and the juxtaposition of dissimilar terms implies the logical "and" connective between terms so written.

As a check, the logical equations thus expressed may be "solved" in a numeric sense by substituting for each letter the corresponding digit of the number (while retaining the superbars of the equation), and reducing the resulting equation using the following combinatory identities:

| | |
|---|---|
| $\bar{0}=1$ | $\bar{1}=0$ |
| $0.0=0$ | $0+0=0$ |
| $0.1=0$ | $0+1=1$ |
| $1.0=0$ | $1+0=1$ |
| $1.1=1$ | $1+1=1$ |

If the resulting identity is true, then the condition of relative magnitude specified by the original equation is also true.

Equations 1 and 3 may be joined by means of the logical "or" connective to form a single equation indicating that $A>B$ if either (1) or (3) is satisfied, thus:

$$A>B \text{ if } (A_n\bar{B}_n+(A_nB_n+\bar{A}_n\bar{B}_n)A_{n-1}\bar{B}_{n-1}=1 \quad (5)$$

Similarly, Equations 2 and 4 may be joined to form the equation:

$$A<B \text{ if } \bar{A}_nB_n+(A_nB_n+\bar{A}_n\bar{B}_n)\bar{A}_{n-1}B_{n-1}=1 \quad (6)$$

The iteration and combination thus defined may be continued until all digits have been considered, forming the most general equations:

$$A>B \text{ if } A_n\bar{B}_n+(A_nB_n+\bar{A}_n\bar{B}_n)A_{n-1}\bar{B}_{n-1} +(A_nB_n+\bar{A}_n\bar{B}_n)(A_{n-1}B_{n-1}+\bar{A}_{n-1}\bar{B}_{n-1})A_{n-2}\bar{B}_{n-2} + \ldots +(A_nB_n+\bar{A}_n\bar{B}_n) \ldots (A_2B_2+\bar{A}_2\bar{B}_2)A_1\bar{B}_1=1 \quad (7)$$

and $$A<B \text{ if } \bar{A}_nB_n+(A_nB_n+\bar{A}_n\bar{B}_n)\bar{A}_{n-1}B_{n-1} +(A_nB_n+\bar{A}_n\bar{B}_n)(A_{n-1}B_{n-1}+\bar{A}_{n-1}\bar{B}_{n-1})\bar{A}_{n-2}B_{n-2} + \ldots +(A_nB_n+\bar{A}_n\bar{B}_n) \ldots (A_2B_2+\bar{A}_2\bar{B}_2)\bar{A}_1B_1=1 \quad (8)$$

Similarly, it may be noted that $$A=B \text{ if } (A_nB_n+\bar{A}_n\bar{B}_n) \ldots (A_2B_2+\bar{A}_2\bar{B}_2)(A_1B_1+\bar{A}_1\bar{B}_1)=1 \quad (9)$$

Equations 8 and 9 may be added and the resulting equation factored and reduced utilizing the Boolean identity $X+\bar{X}=1$ to yield:

$$A\leqslant B \text{ if } \bar{A}_nB_n+(A_nB_n+\bar{A}_n\bar{B}_n)\bar{A}_{n-1}B_{n-1} +(A_nB_n+\bar{A}_n\bar{B}_n)(A_{n-1}B_{n-1}+\bar{A}_{n-1}\bar{B}_{n-1})\bar{A}_{n-2}B_{n-2} + \ldots (A_nB_n+\bar{A}_n\bar{B}_n) \ldots (A_2B_2+\bar{A}_2\bar{B}_2)(\bar{A}_1+B_1)=1 \quad (10)$$

Equations 7 and 9 could be added similarly to yield an equation descriptive of the condition indicating $A\geqslant B$.

It should be noted that each of the equations thus specified may be converted to an equation defining a complementary relationship between A and B by logically complementing one side of the equation. For example, the logical complement of 1 is 0, and if 0 is substituted for 1 in Equation 7, the resulting equation defines the conditions under which A is not greater than B, or in other words, the conditions under which A is less than or equal to B. Similarly, complementing the left hand side of Equation 7 yields the equation:

$$\bar{A}_nB_n+(A_nB_n+\bar{A}_n\bar{B}_n)\bar{A}_{n-1}B_{n-1}+ (A_nB_n+\bar{A}_n\bar{B}_n)(A_{n-1}B_{n-1}+\bar{A}_{n-1}\bar{B}_{n-1})\bar{A}_{n-2}B_{n-2}+ \ldots +(A_nB_n+\bar{A}_n\bar{B}_n) \ldots (A_2B_2+\bar{A}_2\bar{B}_2)(\bar{A}_1+B_1)=1 \quad (11)$$

which also defines the condition $A\leq B$. This equation will be seen to be identical to Equation 10.

The equations thus derived can be considered to represent equations disposed in space by interpreting the subscripts merely as digit place subscripts, or to represent equations disposed in both space and time by considering that the subscripts represent time sequence as well. It should be understood that there are innumerable alternate forms in which the previously derived equations may be expressed, without departing from the basic relationships established.

Although the equations set forth above define the relative magnitudes of two binary numbers in a weighted binary code, it remains to be seen how these equations may be mechanized in terms of the basic digit comparator shown in Figure 1. In order to determine the mechanization techniques more fully, it now becomes necessary to consider the inherent response of bistable elements in terms of Boolean algebraic expressions. Once this relationship is established, the mechanization of any particular embodiment of the present invention is accomplished by merely setting the appropriate Boolean algebraic expansion in time of the desired comparison relationship for a particular code, equal to the Boolean algebraic equation which defines the desired response of the bistable element over the same interval in time.

If the equation thus formed is true, then, according to the logic of propositional calculus, corresponding terms of the equality must be equal. The resulting equation may thus be "solved" by setting terms representing the input signals to the bistable element equal to corresponding terms in the code expansion, yielding equalities which define the signals to be applied to the inputs at particular intervals in time. The mechanization of particular structure to respond according to these equations then follows in a straight-forward manner.

The response of bistable elements to applied input signals may readily be expressed in terms of logical equations. For example, the conventional two-input Eccles-Jordan flip-flop or multivibrator is responsive to a signal applied to either of its inputs to set to the corresponding stable state, and to the simultaneous application of input signals to both its inputs to change from one to the other of its stable states. If the "1" state of the multivibrator is denominated by Q, the "0" state by $\bar{Q}$, the application of a signal to the "1" setting input by J, the application of a signal to the "0" setting input by K, and the non-application of input signals to the "1" and "0" setting inputs by $\bar{J}$ and $\bar{K}$, respectively, then the response of the multivibrator may be expressed in logical equations as:

$$Q_t = J_t \bar{Q}_{t-1} + \bar{K}_t Q_{t-1} \quad (12)$$
$$\bar{Q}_t = \bar{J}_t \bar{Q}_{t-1} + K_t Q_{t-1} \quad (13)$$

where the subscripts $t$ and $t-1$ have the significance of particular intervals in time. Equations 12 and 13 may be written over time intervals $t$ and $t+1$ as $$Q_{t+1} = J_{t+1} \bar{Q}_t + \bar{K}_{t+1} Q_t \quad (14)$$
$$\bar{Q}_{t+1} = \bar{J}_{t+1} \bar{Q}_t + K_{t+1} Q_t \quad (15)$$

Substituting in Equations 14 and 15 the values of $Q_t$ and $\bar{Q}_t$ given by Equations 12 and 13 and factoring yields, $$Q_{t+1} = (J_{t+1}\bar{K}_t + \bar{K}_{t+1}\bar{K}_t) Q_{t-1} + (J_{t+1}\bar{J}_t + \bar{K}_{t+1} J_t) \bar{Q}_{t-1} \quad (16)$$

$$\bar{Q}_{t+1} = (\bar{J}_{t+1} K_t + K_{t+1}\bar{K}_t) Q_{t-1} + (\bar{J}_{t+1}\bar{J}_t + K_{t+1} J_t) \bar{Q}_{t-1} \quad (17)$$

The equation thus formed may be expanded over additional time intervals by continuing the expansion in this manner.

From the above equations, one may readily derive an embodiment of the invention designed to indicate the comparative relations $A>B$ and $A \leqslant B$ between two multi-digit weighted binary numbers A and B, wherein the respective digits of the two numbers are supplied corresponding digits at the same time in the order of least significant digit first. The embodiment will include as a bistable element an Eccles-Jordan flip-flip, or any other element having an equivalent response characteristic, and include means for setting the bistable element to its "1" state for the condition $A>B$, and to its "0" state for the condition $A \leqq B$. The exact structure of the means associated with the bistable element may be derived most conveniently by following the mathematical procedure outlined above. While the derivation will be based on the comparison of two three-digit numbers, it can readily be shown that the equation derived, and the mechanization thereof, may be used to compare two numbers having an number of digits.

Equation 7, expressed in terms of two three-digit numbers is:

$$A_3\bar{B}_3 + (A_3B_3 + \bar{A}_3\bar{B}_3)A_2\bar{B}_2 + (A_3B_3 + \bar{A}_3\bar{B}_3)(A_2B_2 + \bar{A}_2\bar{B}_2)A_1\bar{B}_1 = 1 \quad (18)$$

where the subscript 1 indicates the least significant digit, 2 the next least significant digit, etc.

Similarly, the response equations for the flip-flop over the $(t+1)$ and $(t+2)$ time intervals may be set up, forming equations similar to Equations 12, 13, and 14, 15. The values of $Q_{t+1}$ and $\bar{Q}_{t+1}$ of Equations 16 and 17 may then be substituted in these equations. If, in the resulting equations, the $t-1$ time interval is considered the 0 or initial interval, the $t$ the first interval, etc., the equation for $Q_3$ becomes, after factoring, $$Q_3 = [(J_3\bar{J}_2 + \bar{K}_3 J_2)K_1 + (J_3K_2 + \bar{K}_3\bar{K}_2)\bar{K}_1]Q_0 + [(J_3\bar{J}_2 + \bar{K}_3J_2)\bar{J}_1 + (J_3K_2 + \bar{K}_3\bar{K}_2)J_1]\bar{Q}_0 \quad (19)$$

where $Q_0$ or $\bar{Q}_0$ is the setting of the flip-flop prior to the application of the input signals and the subscripts have the significance of time. Since the flip-flop may be set to one or the other of its stable states prior to the initiation of the comparison operation, it will be assumed that it is initially set to its "0" or $\bar{Q}_0$ state. With such an initial setting, $Q_0$ assumes a value of "0" and $\bar{Q}_0$ a value of "1". Substituting these values in Equation 19 for each of $Q_0$ and $\bar{Q}_0$ causes the terms in $Q_0$ of Equation 19 to disappear from the equation, which accordingly reduces to:

$$Q_3 = (J_3\bar{J}_2 + \bar{K}_3J_2)\bar{J}_1 + (J_3K_2 + \bar{K}_3\bar{K}_2)J_1 \quad (20)$$

Setting the left hand side of Equation 18, the time expansion for the code, equal to the right hand side of Equation 20, the response equation of the flip-flop yields:

$$A_3\bar{B}_3 + (A_3B_3 + \bar{A}_3\bar{B}_3)A_2\bar{B}_2 + (A_3B_3 + \bar{A}_3\bar{B}_3)(A_2B_2 + \bar{A}_2\bar{B}_2)A_1\bar{B}_1 = (J_3\bar{J}_2 + \bar{K}_3J_2)\bar{J}_1 + (J_3K_2 + \bar{K}_3\bar{K}_2)J_1 \quad (21)$$

Expanding by utilizing the Boolean identity, $$X + Y = \bar{X}Y$$

and factoring the left hand side of Equation 21 yields $$[(A_3\bar{B}_3)(\bar{A}_2 + B_2) + (A_3 + \bar{B}_3)(A_2\bar{B}_2)](\bar{A}_1 + B_1) + [(A_3\bar{B}_3)(\bar{A}_2B_2) + (A_3 + \bar{B}_3)(A_2 + \bar{B}_2)](A_1\bar{B}_1 = (J_3\bar{J}_2 + \bar{K}_3J_2)\bar{J}_1 + (J_3K_2 + \bar{K}_3\bar{K}_2)J_1 \quad (22)$$

It will be seen by inspection that this identity is true, for example if $$J_1 = A_1\bar{B}_1 \qquad \bar{J}_1 = \bar{A}_1 + B_1$$
$$J_2 = A_2\bar{B}_2 \qquad \bar{J}_2 = \bar{A}_2 + B_2$$
$$J_3 = A_3\bar{B}_3 \qquad \bar{K}_2 = A_2 + \bar{B}_2$$
$$K_2 = \bar{A}_2B_2 \qquad \bar{K}_3 = A_3 + \bar{B}_3$$

Alternatively, Equation 10, which defines a relationship complementary to Equation 7 may be utilized in conjunction with the flip-flop response-defining equations for $\bar{Q}_3$ corresponding to Equations 19 and 20 to form an identity corresponding to Equation 21. Such an equation when factored in a manner analagous to Equation 22 would yield the identity:

$$[(\bar{A}_3 + B_3)(\bar{A}_2 + B_2) + (\bar{A}_3B_3)(A_2\bar{B}_2)]\bar{A}_1 + B_1) + [(\bar{A}_3 + B_3)(A_2B_2) + (\bar{A}_3B_3)(A_2 + \bar{B}_2)]A_1\bar{B}_1 = (\bar{J}_3\bar{J}_2 + K_3J_2)\bar{J}_1 + (\bar{J}_3K_2 + K_3\bar{K}_2)J_1 \quad (23)$$

which is true, if, for example $$J_1 = A_1\bar{B}_1 \qquad \bar{J}_1 = \bar{A}_1 + B_1$$
$$J_2 = A_2\bar{B}_2 \qquad \bar{J}_2 = \bar{A}_2 + B_2$$
$$K_2 = \bar{A}_2B_2 \qquad \bar{J}_3 = \bar{A}_3 + B_3$$
$$K_3 = \bar{A}_3B_3 \qquad \bar{K}_2 = A_2 + \bar{B}_2$$

The above identities are therefore both satisfied if $$J_1 = A_1\bar{B}_1$$
$$J_2 = A_2\bar{B}_2 \qquad \bar{K}_2 = \bar{A}_2B_2$$
$$J_3 = A_3\bar{B}_3 \qquad K_3 = \bar{A}_3B_3$$

The above equations thus imply that the comparison operation may be carried out by applying a signal to the J input during the first interval of time if $A_1$ and $\bar{B}_1$ exist, during the second interval of time if $A_2$ and $\bar{B}_2$ exist, etc., and applying a signal to the K input during the second interval of time if $\bar{A}_2$ and $B_2$ exist, during the third interval of time if $\bar{A}_3$ and $B_3$ exist, etc.

It should be noted that $K_1$ does not appear as a coefficient in either of the above equations and accordingly no input is specified for the K input during the first interval of time. Since it has been assumed that the flip-flop is initially set to its "0" state, any K input may be applied during the first interval of time without affecting the state of the flip-flop. For purposes of symmetry the $K_1$ input during the first interval of time will be specified as $\bar{A}_1B_1$. An embodiment of the invention mechanized according to the above principles is shown in Figure 2.

Figure 2:
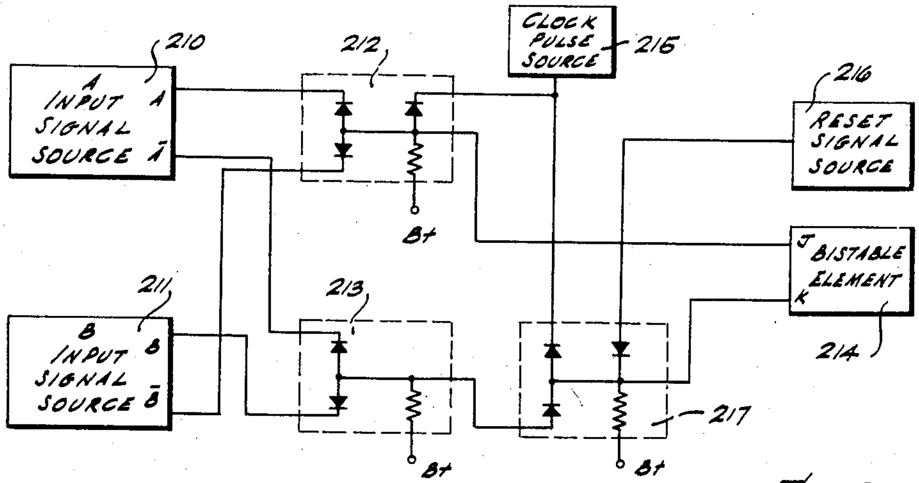
Figure 2 is a block diagram of an embodiment of the comparator according to the present invention for comparing weighted binary numbers, least significant digits first.

As shown in Figure 2, the comparator includes a pair of signal sources 210 and 211 for supplying complementary input signals A, $\bar{A}$, and B, $\bar{B}$, respectively, representing in bilevel voltage form the successive digits of first and second numbers to be compared, to a pair of control means such as logical "and" networks 212 and 213 which in turn apply their output signals to a bistable element such as multivibrator 214. More specifically, input signal source 210 produces relatively high and low level signals on output terminals A and $\bar{A}$, respectively, when the signals supplied represent a "1" digit of the first number, and produces relatively low and high voltage level signals on output terminals A and $\bar{A}$, respectively, when the signals supplied represent a "0" digit of the first number. Input signal source 211 produces similar high and low level signals on output terminals B and $\bar{B}$ when the signals supplied represent "1" and "0" digits for the second number.

Logical "and" network 212, which may be similar to the logical "and" network described in copending U.S. application for patent, Serial No. 305,955, entitled "Electronic Gate," by Eldred C. Nelson, filed August 23, 1952, receives input signals A and $\bar{B}$ and a clock pulse signal from a clock pulse source 215 and applies the clock pulse signal to the J input terminal of bistable element 214 whenever signals A and $\bar{B}$ are at the "1" level. Logical "and" network 213, which may be similar to logical "and" network 212, receives input signals $\bar{A}$ and B and applies an output signal to logical "or" network 217 whenever signals $\bar{A}$ and B are at the "1" level. Logical "or" network 217, which may be similar to the logical "or" networks described in copending U.S. application for patent, Serial No. 327,133, entitled "Diode, Pulse-Gating Circuits," by Richard D. Forrest, filed December 20, 1952, has its remaining input terminals connected to clock pulse source 215 and reset signal source 216 and applies the clock pulse signal to the K input terminal of bistable element 214 whenever either of its remaining inputs is at the "1" level. Bistable element 214 may be a conventional Eccles-Jordan Multivibrator such as has heretofore been described.

Bistable element 214 in turn, is set to its "1" state in response to a clock pulse applied to its J input terminal and to its "0" state in response to a clock pulse applied to its K input terminal. Thus, it is seen that if signals A and $\bar{B}$ are each at a comparatively high voltage level, corresponding to a "1" digit for the first number and a "0" digit for the second number, and a clock pulse is applied to network 212, bistable element 214 will be set to its "1" state, while if signals $\bar{A}$ and B are each at a comparatively high voltage level, corresponding to a "0" digit for the first number and a "1" digit for the second number, and a clock pulse is applied to network 217 the bistable element will be set to its "0" state. Reset signal source 216 may be used to apply a reset signal to network 217 to cause the network to pass a clock pulse whenever it is desired to arbitrarily set the element to its "0" state.

Considering now the response of the comparator thus described when used to compare two multidigit weighted binary numbers A and B, bistable element 214 may initially be set to its "0" state by means of reset signals supplied from source 216. To carry out the comparison operation sources 210 and 211 may apply the signals representing the two numbers to each of means 212 and 213 in the order of least significant digit signals first, corresponding digit signals being applied at the same time. Simultaneously with the application of each pair of input digit signals, clock pulse source 215 applies a clock pulse to each of logical networks 212 and 217. As each pair of corresponding digit signals is successively applied to networks 212 and 213, bistable element 214 will accordingly be set to a state indicative of the sense of the nonidentity between nonidentical digit signals, while for identical digit signals no setting operation will take place. Since the digit signals are applied least significant digit first, the state of the bistable element after all digit signals have been applied will be a direct indication of the sense of the nonidentity of the last applied, or most significant, nonidentical digit signals.

Where the two numbers to be compared are identical and, therefore, each pair of corresponding digit signals are identical, the bistable element will remain in its initial state throughout the period of application of the input signals. Thus, where the bistable element has been initially set to its "0" state and is in its "0" state following the application of all digit signals, the indication must be interpreted as either an indication of relative magnitude in the sense heretofore noted or as an indication of identity, that is $A \leqslant B$. On the other hand, a "1" setting at the end of the comparison operation indicates $A > B$. Where it is desired to distinguish between the condition $A < B$ and $A = B$, other systems well known in the art may be utilized.

Alternatively, it may be desirable to indicate the relation $A \geqslant B$ by a "1" setting of the bistable element and the relation $A < B$ by a "0" setting. This may be accomplished by applying the reset signal supplied by signal source 216 to the J input terminal of the bistable element, that is, by inserting logical "or" network 217 in the J input circuit rather than the K input circuit. In this manner, in the absence of nonidentical digit signals, bistable element 214 will remain in its "1" state, thereby indicating the equality condition.

Although the comparator of Figure 2 operates upon numbers applied serially least significant digit first, an embodiment of the invention designed to indicate the same comparative relations wherein the respective digits of the two numbers are supplied in the order of most significant digit first may also be derived from the basic equations. This embodiment will also include a bistable element similar to that shown in Figure 2, and control means for setting the bistable element to its "1" state for the condition $A > B$, and to its "0" state for the condition $A \leqslant B$. The exact structure of the means associated with the bistable element may be derived most conveniently by following the mathematical procedure previously outlined.

It should be noted that under the last named mode of application of the digits, the most significant nonidentical digits of the two numbers will be the first occurring nonidentity, and the comparator must include means for inhibiting the response of the bistable element to the application of further digits which might alter the state to which the element is set by the first nonidentity. The desired response of the bistable element under this mode of operation therefore represents a restriction on the general response equation heretofore employed. More particularly, the "1" setting expansion of the flip-flop equation can now include only those terms which provide that once the flip-flop has been set to "1," it thereafter remains "1." Equation 20 thus becomes:

$$Q_3 = (J_3\bar{J}_2 + \bar{K}_3 J_2)\bar{J}_1 + (\bar{K}_3\bar{K}_2)J_1 \qquad (24)$$

if it is again assumed that the flip-flop is initially set to its "0" state.

Equation 18 is modified by changing the subscripts so that the most significant digits carry the subscript 1, the next most significant 2, etc. When modified in this manner, the equation becomes:

$$A_1\bar{B}_1 + (A_1B_1 + \bar{A}_1\bar{B}_1)A_2\bar{B}_2 + (A_1B_1 + \bar{A}_1\bar{B}_1)(A_2B_2 + \bar{A}_2\bar{B}_2)A_3\bar{B}_3 = 1 \qquad (25)$$

Then setting the right hand side of Equation 24 equal to the left hand side of Equation 25 yields:

$$A_1\bar{B}_1 + (A_1B_1 + \bar{A}_1\bar{B}_1)A_2\bar{B}_2 + (A_1B_1 + \bar{A}_1\bar{B}_1)(A_2B_2 + \bar{A}_2\bar{B}_2)A_3\bar{B}_3 = (\bar{K}_3\bar{K}_2)\bar{J}_1 + (J_3\bar{J}_2 + \bar{K}_3J_2)\bar{J}_1 \qquad (26)$$

which is the basic equation descriptive of the desired embodiment of the invention.

In order to determine the appropriate function for the J and K inputs, use may be made of the logical identity:

$$AB + \bar{A}\bar{B}) = (\bar{A} + B)(A + \bar{B})$$

Factoring the left hand side of Equation 26 by making use of the identity and rearranging terms yields, for Equation 26:

$$[A_3\bar{B}_3(A_2+\bar{B}_2)(\bar{A}_2+B_2)(A_1+\bar{B}_1)+A_2\bar{B}_2(A_1+\bar{B}_1)]$$
$$(\bar{A}_1+B_1)+A_1\bar{B}_1=(J_3\bar{J}_2+\bar{K}_3J_2)\bar{J}_1+(\bar{K}_3\bar{K}_2)J_1 \quad (27)$$

It will be seen that this identity is true, for example, if $$J_1=A_1\bar{B}_1$$
$$J_2=A_2\bar{B}_2(A_1+\bar{B}_1)$$
$$J_3=A_3\bar{B}_3(A_2+\bar{B}_2)(A_1+\bar{B}_1)$$
$$\bar{J}_1=(\bar{A}_1+B_1)$$
$$\bar{J}_2=(\bar{A}_2+B_2)+(\bar{A}_1B_1)$$
$$\bar{K}_3\bar{K}_2=1$$
$$\bar{K}_3=1$$

The value of $\bar{J}_2$ includes a factor not present in the original equation, $\bar{A}_1B_1$. This factor is included in order that $\bar{J}_2$ be the complement of $J_2$; its inclusion does not, however, modify the original equation, since $$\bar{A}_1B_1(A_1+\bar{B}_1)=0$$

$\bar{J}_3$ may be found by considering another interval of time, or by complementing $J_3$. In either case, $$\bar{J}_3=(\bar{A}_3+B_3)+(\bar{A}_2B_2)+(\bar{A}_1B_1)$$

The above equations thus imply that the comparison operation may be carried out by applying a signal to the J-input during each successive interval of time, the signal to be applied being the signal given by the right hand side of the J equalities. While the K-input signals are not defined, they may be found by complementing the $\bar{K}$ equalities which yield for the $K_2$ and $K_3$ input signals a value of 0. Since $K_1$ is undefined, it may be given any value; for purposes of symmetry the value of $K_1$ will likewise be taken as 0. Accordingly, if the flip-flop is initially set to its "0" state, no input signal need be applied to the K input of the flip-flop during the comparison operation.

The signals applied to the J input during any particular interval of time will be seen to include a factor formed from particular digits having the same time subscript as those of the embodiment of Fig. 2, and a factor derived from previously occurring or more significant digits. Similarly, the $\bar{J}$ terms, which imply the nonapplication of input signals to the J input, likewise include terms having the same time subscript as the $\bar{J}$ term of the embodiment of Fig. 2 and other terms formed from previously occurring or more significant digits. As will be shown in the embodiment described below, the logical operation of forming the required prior digit signals for the J input and the storage of the formed factors may be performed most conveniently by means of an additional bistable element. The factor having the same time subscript may as before be formed by means of logical networks.

Figure 3:
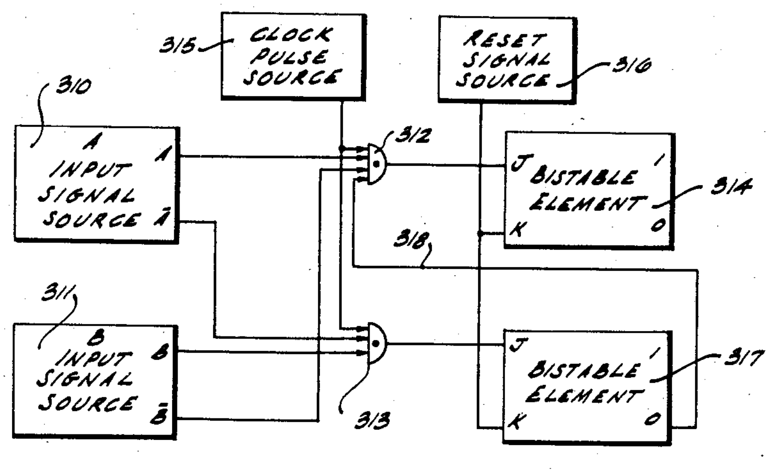
Figure 3 is a block diagram of another embodiment of the comparator of this invention for comparing weighted binary numbers, most significant digits first.

Referring now to Fig. 3, there is shown a comparator mechanized according to the above equations. As shown in Fig. 3, the comparator includes a pair of signal sources 310 and 311 for supplying complementary input signals A, Ā, and B, B̄, respectively, representing in bilevel voltage form the successive digits of the first and second numbers to be compared to a pair of logical "and" networks 312 and 313, which in turn supply their output signals to the J input terminals of bistable elements 314 and 317, respectively. A clock pulse source 315 supplies a clock or comparison pulse to each of "and" networks 312 and 313 while a source of reset signals 316 is connected to the K input terminals of each of bistable elements 314 and 317. Logical "and" network 312 also receives an input signal from the "0" output terminal of bistable element 317.

More specifically, input signal sources 310 and 311 are similar to input signal sources 210 and 211 of Fig. 2, except that the digit signals are now supplied in the order of most significant digit first. Logical "and" network 312 is a four input terminal network similar to network 212 of Fig. 2 and receives input signals A, B̄, the signal produced on the "0" output terminal of bistable element 317, and a clock pulse signal from source 315. Logical network 312 operates to pass the clock pulse signal to the J input terminal of element 314 when a "1" input signal is applied to its three remaining input terminals. Logical "and" network 313, which may be similar to logical "and" network 212, receives input signals Ā and B and a clock pulse and passes the clock pulse to its output terminal whenever both of its remaining input terminals receive "1" input signals.

Bistable elements 314 and 317 may be similar to the previously described Eccles-Jordan multivibrators except that use is now made of a "0" output terminal on bistable element 317. This bistable element produces signals of comparatively high and low voltage level on its "0" output terminal whenever the bistable element is in its "0" state and its "1" state, respectively.

Considering now the operation of the comparator thus described, bistable elements 314 and 317 may be set to their "0" states prior to the initiation of the comparison process by applying a reset signal to the K inputs by means of reset signal source 316. When set to its "0" state, bistable element 317 produces a high level or "1" output signal on its "0" output terminal which, in turn, is applied to one of the input terminals of logical network 312. Sources 310 and 311 and clock pulse source 315 apply their signals to networks 312 and 313 in a manner similar to that described in connection with the comparator of Fig. 2, except that the digit signals are applied in the order of most significant digit signals first.

If the digit signals being applied are identical, no output signals will be produced by either of networks 312 and 313 and bistable elements 314 and 317 will remain in their initial or "0" state throughout the comparison process. However, when the first or most significant pair of nonidentical digit signals are applied, an output signal will be produced by one of logical networks 312 or 313, depending on the sense of the nonidentity. If the digit signals are dissimilar in the sense that the A digit signal is a "1" and the B digit signal is a "0," a clock pulse will be passed by network 312 and will set bistable element 314 to its "1" state, thereby indicating that the first occurring nonidentity was an A B̄ nonidentity. If, on the other hand, the first occurring nonidentity was an Ā B nonidentity, logical network 313 will pass a clock pulse signal which, in turn, will set bistable element 317 to its "1" state thereby producing a low level or "0" output signal on its "0" output terminal. Under these conditions, the input signal applied to logical network 312 from element 317 will be a "0" input signal and the condition that all of the input signals to network 312 be "1" signals will not be satisfied until bistable element 317 has been reset to its "0" state. Accordingly, logical network 312 will not thereafter pass a clock pulse and bistable element 314 will remain in its "0" state. The "0" indication of bistable element 314 may thus be interpreted as indicating the condition $A \leq B$ while a "1" setting of bistable element 314 indicates the condition $A > B$.

It may thus be seen that the comparison process or the application of further input signals by sources 310 and 311 may be discontinued once either bistable element 314 or 317 has been set to its "1" state. If the application of further digit signals is not discontinued once either of the bistable elements has been set to its "1" state and the set element was 314, later occurring or less significant nonidentical digit signals in the sense Ā B will have no effect upon the state of element 314. If neither bistable element is set to its "1" state, the comparison process must be continued until all digits of the two numbers being compared have been applied.

It is, therefore, seen that the comparator of Fig. 3 operates upon numbers applied most significant digits first to indicate the relative magnitudes thereof. This comparator includes the same basic combination as that shown in Fig. 1, namely, a bistable element 314, control means including logical network 312 for setting element 314 to one of its stable states in response to a nonidentity of one sense, and control means, including reset signal source 316, bistable element 317 and network 313, for setting element 314 to the other of its stable states in response to a nonidentity of the other sense. More specifically, if bistable element 314 is in its "1" state at the end of the comparison process, then $A>B$, while $A\leqslant B$ if bistable element 314 is in its "0" state.

Although the invention has thus far been described for serial modes of operation, the basic concept is equally applicable to indicate the comparative relations $A>B$ and $A\leqslant B$ between two multi-digit weighted binary numbers A and B, wherein the respective digits of the two numbers are available for comparison at the same instant in time. In this parallel mode of operation, the bistable element equations need be considered over only one interval of time, and are therefore:

$$Q_1=J_1\bar{Q}_0+\bar{K}_1Q_0 \quad (28)$$

$$\bar{Q}_1=\bar{J}_1\bar{Q}_0+K_1Q_0 \quad (29)$$

where the terms have the same significance as before, the subscripts indicating instants in time. The code equations, over four digit places are:

$$A>B \text{ if } A_1\bar{B}_1+(A_1B_1+\bar{A}_1\bar{B}_1)A_2\bar{B}_2+(A_1B_1+\bar{A}_1\bar{B}_1)(A_2B_2+\bar{A}_2\bar{B}_2)A_3\bar{B}_3+(A_1B_1+\bar{A}_1\bar{B}_1)(A_2B_2+\bar{A}_2\bar{B}_2)(A_3B_3+\bar{A}_3\bar{B}_3)A_4\bar{B}_4=1 \quad (30)$$

$$A\leqslant B \text{ if } \bar{A}_1B_1+(A_1B_1+\bar{A}_1\bar{B}_1)\bar{A}_2B_2+(A_1B_1+\bar{A}_1\bar{B}_1)(A_2B_2+\bar{A}_2\bar{B}_2)\bar{A}_3B_3+(A_1B_1+\bar{A}_1\bar{B}_1)(A_2B_2+\bar{A}_2\bar{B}_2)(A_3B_3+\bar{A}_3\bar{B}_3)(\bar{A}_4+B_4)=1 \quad (31)$$

where the 1 subscripts indicate the most significant digits, the 2 subscripts the next most significant digits, etc., it being understood that all of the digit signals are supplied at the same instant in time.

Setting the left hand side of Equation 30 equal to the right hand side of Equation 28, and the left hand side of Equation 31 equal to the right hand side of Equation 29, yields, as the defining equations for the embodiment:

$$A_1\bar{B}_1+(A_1B_1+\bar{A}_1\bar{B}_1)A_2\bar{B}_2+(A_1B_1+\bar{A}_1\bar{B}_1)(A_2B_2+\bar{A}_2\bar{B}_2)A_3\bar{B}_3+(A_1B_1+\bar{A}_1\bar{B}_1)(A_2B_2+\bar{A}_2\bar{B}_2)(A_3B_3+\bar{A}_3\bar{B}_3)A_4\bar{B}_4=J_1\bar{Q}_0+\bar{K}_1Q_0 \quad (32)$$

$$\bar{A}_1B_1+(A_1B_1+\bar{A}_1\bar{B}_1)\bar{A}_2B_2+(A_1B_1+\bar{A}_1\bar{B}_1)(A_2B_2+\bar{A}_2\bar{B}_2)\bar{A}_3B_3+(A_1B_1+\bar{A}_1\bar{B}_1)(A_2B_2+\bar{A}_2\bar{B}_2)(A_3B_3+\bar{A}_3\bar{B}_3)(\bar{A}_4+B_4)=\bar{J}_1\bar{Q}_0+K_1Q_0 \quad (33)$$

The above equations are true, if, for example $$J_1=A_1\bar{B}_1+(A_1B_1+\bar{A}_1\bar{B}_1)A_2\bar{B}_2+(A_1B_1+\bar{A}_1\bar{B}_1)(A_2B_2+\bar{A}_2\bar{B}_2)A_3\bar{B}_3+(A_1B_1+\bar{A}_1\bar{B}_1)(A_2B_2+\bar{A}_2\bar{B}_2)(A_3B_3+\bar{A}_3\bar{B}_3)A_4\bar{B}_4 \quad (34)$$

$$K_1=\bar{A}_1B_1+(A_1B_1+\bar{A}_1\bar{B}_1)\bar{A}_2B_2+(A_1B_1+\bar{A}_1\bar{B}_1)(A_2B_2+\bar{A}_2\bar{B}_2)\bar{A}_3B_3+(A_1B_1+\bar{A}_1\bar{B}_1)(A_2B_2+\bar{A}_2\bar{B}_2)(\bar{A}_3\bar{B}_3+A_3B_3)(\bar{A}_4+B_4) \quad (35)$$

The comparator may accordingly be mechanized without reference to the original setting of the bistable element by applying the signals defined by Equations 34 and 35 to the J and K inputs of the bistable element, respectively. However, it should be noted that the right-hand side of Equations 34 and 35 are complementary in the sense previously noted in connection with the derivation of the basic code defining formulas. Accordingly, if use is made of a circuit, such as a complementer circuit shown in the copending U.S. application for patent, Serial No. 308,045, by Daniel L. Curtis, entitled "Complementer Signal Generating Network," filed September 5, 1952, now Patent No. 2,812,451, November 5, 1957, the structure for the comparator need only include a network mechanizing one of the equations. A comparator mechanized according to these principles which provides for the simultaneous comparison of all digits of two 6-digit weighted binary numbers is shown in Fig. 4.

Figure 4:
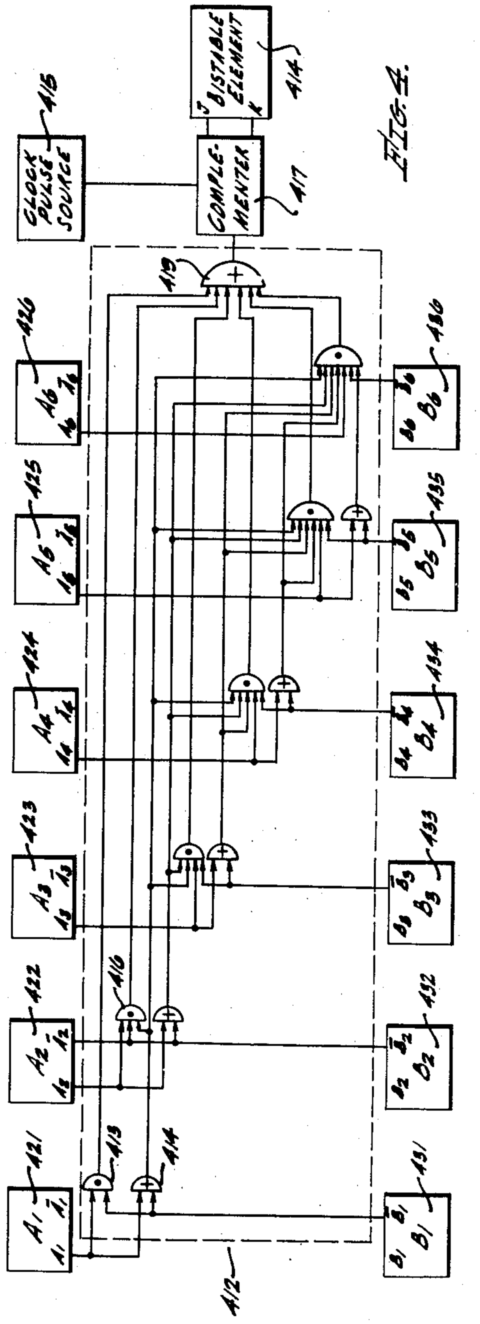
Figure 4 is a block diagram of an embodiment of a comparator for comparing weighted binary numbers in parallel.

As shown in Fig. 4, the embodiment includes input signal sources 421, 422, 423, 424, 425 and 426 for supplying complementary input signals $A_1$, $\bar{A}_1$; $A_2$, $\bar{A}_2$; $A_3$, $\bar{A}_3$; $A_4$, $\bar{A}_4$; $A_5$, $\bar{A}_5$; and $A_6$, $\bar{A}_6$; respectively, representing in bilevel voltage form the successive digits of a first number to be compared; input signal sources 431, 432, 433, 434, 435 and 436 for supplying complementary input signals $B_1$, $\bar{B}_1$; $B_2$, $\bar{B}_2$; $B_3$, $\bar{B}_3$; $B_4$, $\bar{B}_4$; $B_5$, $\bar{B}_5$; and $B_6$, $\bar{B}_6$; respectively, representing the successive digits of a second number to be compared; a gating matrix 412 for receiving the input signals; a complementer circuit 417 for receiving the output signal from gating matrix 412; and a bistable element 414 for receiving the output signals from complementer circuit 417. Complementer circuit 417 also receives clock pulses from a clock pulse source 415 and has its "1" and "0" output terminals connected to the J and K input terminals, respectively, of bistable element 414.

More specifically, input signal sources 421 through 426 and 431 through 436 are similar to the input signal sources discussed in connection with the embodiment of the invention shown in Figure 2 except that each signal source presents a signal representing one digit of the number. The subscripts in Fig. 4 indicate the digit place of the digit represented, the most significant digit having the subscript 1, the digits thereafter being arranged in the order of decreasing significance.

Gating matrix 412 is a logical gating network which receives input signals from the input signal sources and produces an output signal of comparatively high voltage level when the first number is greater than the second number being compared, and an output signal of comparatively low voltage level when that condition is not satisfied, that is, when the second number is greater than or equal to the first number being compared. The output signal from gating matrix 412 is combined with the clock pulse from source 415 in complementer circuit 417 which produces an output signal on its "1" output terminal when the output signal of the gating network is of comparatively high voltage level and on its "0" output terminal when the output signal of the gating network is of comparatively low voltage level. Bistable element 414 may be the conventional Eccles-Jordan multivibrator heretofore described and has its J and K input terminals connected to the "1" and "0" output terminals, respectively, of complementer circuit 417. The structure of logical gating matrix 412 may be most conveniently derived from Equation 34. Expanding this equation to represent two six-digit numbers, the equation becomes:

$$J_1=A_1\bar{B}_1+(A_1B_1+\bar{A}_1\bar{B}_1)A_2\bar{B}_2+(A_1B_1+\bar{A}_1\bar{B}_1)(A_2B_2+\bar{A}_2\bar{B}_2)A_3\bar{B}_3+(A_1B_1+\bar{A}_1\bar{B}_1)(A_2B_2+\bar{A}_2\bar{B}_2)(A_3B_3+\bar{A}_3\bar{B}_3)A_4\bar{B}_4+(A_1B_1+\bar{A}_1\bar{B}_1)(A_2B_2+\bar{A}_2\bar{B}_2)(A_3B_3+\bar{A}_3\bar{B}_3)(A_4B_4+\bar{A}_4\bar{B}_4)A_5\bar{B}_5+(A_1B_1+\bar{A}_1\bar{B}_1)(A_2B_2+\bar{A}_2\bar{B}_2)\ .\ .\ .\ (A_5B_5+\bar{A}_5\bar{B}_5)A_6\bar{B}_6 \quad (36)$$

While the logical gating matrix may be directly mechanized from this equation, the actual structure required may be considerably reduced if redundant terms are first eliminated from the equation by applying the fundamental theorem of propositional logic:

$$X+\bar{X}Y=X+Y$$

By factoring the first five terms of Equation 36, one obtains:

$$A_1\bar{B}_1+(A_1B_1+\bar{A}_1\bar{B}_1)A_2\bar{B}_2=A_1\bar{B}_1+(A_1+\bar{B}_1)(\bar{A}_1+B_1)A_2\bar{B}_2$$

but $$A_1B_1=\bar{A}_1+B_1$$

so applying the above theorem gives:

$$A_1\bar{B}_1+(A_1B_1+\bar{A}_1\bar{B}_1)A_2\bar{B}_2=A_1\bar{B}_1+(A_1+\bar{B}_1)A_2\bar{B}_2$$

By continuing this reduction process throughout Equation 36, one may arrive at:

$$J_1=A_1\bar{B}_1+(A_1+\bar{B}_1)A_2\bar{B}_2+(A_1+\bar{B}_1)(A_2+\bar{B}_2)A_3\bar{B}_3+(A_1+\bar{B}_1)(A_2+\bar{B}_2)(A_3+\bar{B}_3)A_4\bar{B}_4+(A_1+\bar{B}_1)(A_2+\bar{B}_2)(A_3+\bar{B}_3)(A_4+\bar{B}_4)A_5\bar{B}_5+(A_1+\bar{B}_1)(A_2+\bar{B}_2)(A_3+\bar{B}_3)(A_4+\bar{B}_4)(A_5+\bar{B}_5)A_6\bar{B}_6 \quad (37)$$

It is this equation that is mechanized as logical gating matrix 412. As shown in Figure 4, the matrix includes six logical "and" networks and six logical "or" networks, the logical "and" networks being similar to those previously described, while the logical "or" networks may be similar to the voltage level mixing circuits described at pages 511 through 514 of an article entitled "Diode Coincidence and Mixing Circuits in Digital Computers," by Tung Chang Chen, in "Proceedings of the I.R.E.," for May 1950. The interconnection of the various gates is directly described by Equation 37 which defines six alternative conditions under which a high level output signal should appear at the output terminal of the matrix.

As specified by the first term of Equation 37, one of the alternative conditions is if the $A_1$ digit is a "1" and the $B_1$ digit is a "0," and is mechanized by a logical "and" network 413. The output terminal of logical "and" network 413 is connected to one input terminal of a six-terminal logical "or" network 419.

The second term $(A_1+\bar{B}_1)A_2\bar{B}_2$ of Equation 37 specifies another input to logical "or" network 419 and is mechanized in the gating matrix by a logical "or" network 414 for producing $(A_1+\bar{B}_1)$, and a logical "and" network 416 for combining the output of network 414 with $A_2$ and $\bar{B}_2$. Logical "and" network 416 has its output terminal connected to a second input terminal of logical "or" network 419. The remaining terms in Equation 37 have been mechanized in a similar manner by means of the remaining logical network.

Considering now the operation of the system thus described, the comparison operation may be carried out whenever the input signal sources simultaneously apply their respective input signals to gating matrix 412 and a clock or comparison pulse is applied to the complementer circuit from source 415. If the gating matrix output is at a comparatively high voltage level, corresponding to the conditions specified by Equation 37, the pulse applied to the complementer circuit will be passed to the J input terminal of bistable element 414, setting it to its "1" state. If, on the other hand, the gating matrix output is a comparatively low voltage level, indicating that Equation 37 is not satisfied, the pulse applied to the complementer circuit will be passed to the K input terminal of bistable element 414 setting it to its "0" state. It will thus be seen that the conditions under which the bistable element is set to its "1" state are those produced when $A>B$ while the conditions under which the bistable element is set to its "0" state exist when $A\leqslant B$. Accordingly, the setting of the bistable element may be considered to directly indicate the relative magnitude of the two numbers in accordance with logical formulas previously derived.

If it is desired to eliminate the complementer circuit shown in Fig. 4, the comparator may be mechanized by including means to set bistable element 414 to its "0" state prior to the comparison operation and means to set the bistable element to its "1" state if Equation 36 or 37 is satisfied. Such an embodiment would include means for applying a reset pulse to the K input terminal of the bistable element prior to the comparison operation, a gating matrix similar to gating matrix 412 shown in the original embodiment and an additional "and" network which receives as input signals the output of logical gating matrix 412 and a clock or comparison pulse and applies its output signal to the J input terminal of the bistable element.

Alternatively, where the bistable element is an overriding flip-flop, such as that described in copending U.S. patent application, Serial No. 245,737, entitled "Triggering Networks for Flip-Flop Circuits" by Daniel L. Curtis, filed September 8, 1951, no reset signal source is needed. In this case the additional "and" network controls the application of the comparison pulse to the overriding input terminal, while the comparison pulse is applied directly to the nonoverriding input terminal. The interpretation of the final setting of the bistable element for either of these alternative embodiments follows directly from the previous discussion.

In the discussion thus far of the parallel comparator of Fig. 4, it has been assumed that all of the respective digits of the two numbers are available for comparison at the same instant in time. However, the comparator according to this invention is also applicable when only groups of digits of the two numbers are so available. Such a comparator would be useful, as for example, for comparing two binary coded decimal numbers and would provide for the comparison of two groups of four binary digits simultaneously, representing one decimal digit, followed by the comparison of two more groups of binary digits until all the decimal digits of the two numbers have been compared.

Equations descriptive of the required mechanization of such an embodiment of the present invention may be most conveniently derived following the procedures previously outlined. More particularly, the embodiment will include a bistable element for indicating the relative magnitude of the two numbers, first means for setting the bistable element to one of its stable states when corresponding digits are dissimilar in one sense, and second means for setting the bistable element to its other stable state when corresponding digits are dissimilar in another sense. In this embodiment, however, neither the first nor the second means will provide for setting the bistable element for equalities between the two groups of digits being compared.

If, as set forth above, the groups to be compared are each four digits long, the first means will be mechanized in accordance with Equation 32. However, the second means called for by this embodiment of the invention differs from the means of the previous embodiment in that the bistable element is not to be set to its "0" state when corresponding digits are similar. Accordingly, the required equation may be derived from Equation 8 by appropriate modifications of digit place subscripts, or from Equation 35 by changing the $(\bar{A}_4+B_4)$ factor to $\bar{A}_4B_4$. Equation 35 for the second means therefore becomes $$K_1=\bar{A}_1B_1+(A_1B_1+\bar{A}_1\bar{B}_1)\bar{A}_2B_2+(A_1B_1+\bar{A}_1\bar{B}_1)(A_2B_2+\bar{A}_2\bar{B}_2)\bar{A}_3B_3+(A_1B_1+\bar{A}_1\bar{B}_1)(A_2B_2+\bar{A}_2\bar{B}_2)(A_3B_3+\bar{A}_3\bar{B}_3)\bar{A}_4B_4 \quad (38)$$

The equality condition may be taken into account providing that the bistable element be preset to one of its stable states prior to the initiation of the comparison operation. A comparator mechanized according to these principles is shown in Fig. 5.

Figure 5:
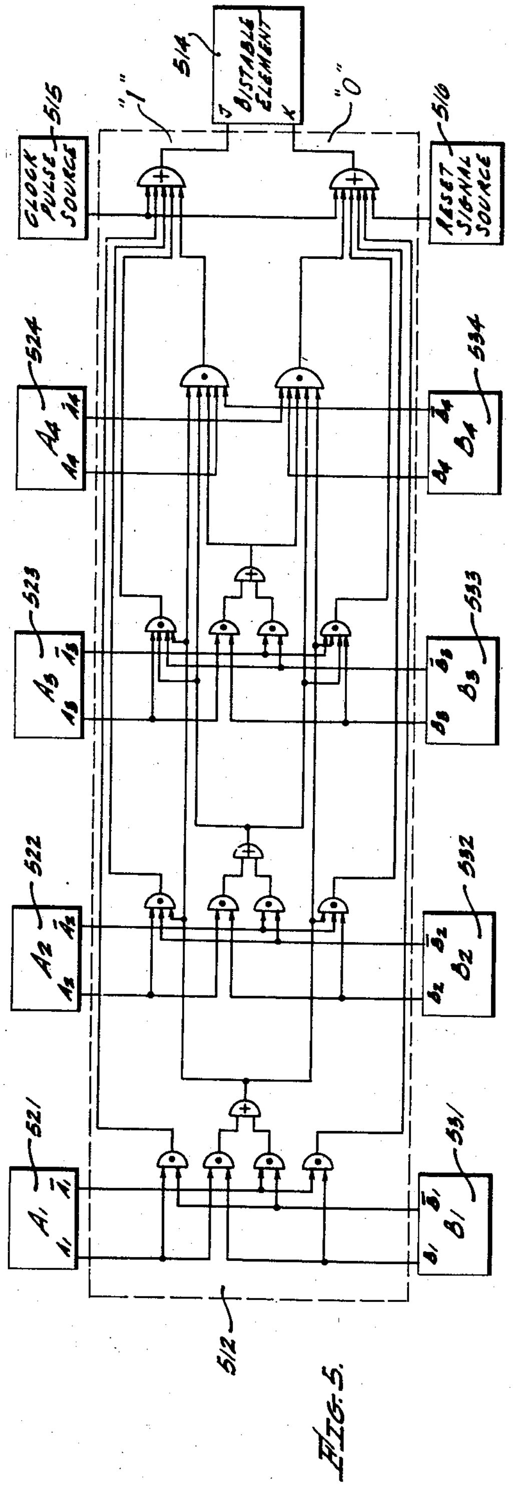
Figure 5 is a block diagram of another embodiment of a comparator for comparing weighted binary numbers in parallel.

As shown in Fig. 5, the comparator includes input signal sources 521, 522, 523, and 524 for supplying complementary input signals representing the successive digits of the first number; input signal sources 531, 532, 533, and 534 for supplying complementary input signals representing the successive digits of the second number; a gating matrix 512 for receiving the input signals and clock pulses from a pulse source 515; and a bistable element 514 for receiving the output signal from matrix 512. More specifically, input signal sources 521 through 524 and 531 through 534 are similar to the input signal sources discussed in connection with the comparator of Fig. 4, while gating matrix 512 is similar to gating matrix 412, except that the final "or" networks of the matrix are clock pulse "or" networks similar to that shown in Fig. 2. Gating matrix 512 is mechanized from Equations 32 and 38 and passes clock pulses to its "1" and "0" output terminals when Equations 32 and 38, respectively, are satisfied by the applied input signals. Since common terms appear in both equations, the output of logical networks mechanizing these terms is used in a manner which reduces the total number of diode gating circuits required to mechanize the equation.

A source of reset signals 516 is connected to one of the inputs of the "or" network associated with the "0" output terminal of matrix 512, and may be used to cause the network to pass a clock pulse whenever it is desired to reset bistable element 514 to its "0" state. The "1" and "0" output treminals of gating matrix 512, in turn are connected to the J and K input terminals, respectively, of bistable element 514, which may be similar to the bistable elements heretofore described.

Considering now the operation of the system thus described, the comparison operation may be carried out by initially setting bistable element 514 to its "0" state by means of an appropriately applied reset signal. Input signal sources 521 through 524 and 531 through 534 may then simultaneously produce signals representing the group of binary digits of the least significant decimal digit of each of the numbers to be compared. The input signal sources may conveniently be stages of a shifting register in which case the simultaneous condition exists after the digits of the two numbers have been shifted into their proper places; or they may be parallel sources which produce the proper input signals simultaneously without shifting. A clock or comparison pulse is applied to matrix 512 when all of the input signals are appropriately applied to the gating matrix.

If corresponding digits of the two groups are not identical, one of the "or" networks will pass the applied pulse which in turn will set the bistable element to an appropriate indication. Since the two groups compared do not represent all of the digits of the two numbers, the bistable element is neither observed nor reset after the first comparison operation and, instead, the next more significant groups of digits are compared. This process is continued, a clock or comparison pulse being applied as each group of digits is available for comparison. After all of digits of the two numbers have been compared, the state of the bistable element will be an indication of the relative magnitudes of the two numbers, the initial state serving to indicate the equality condition as well.

The present invention has been described thus far in connection with numbers encoded in a weighted binary code. However, as pointed out above, comparators according to the present invention may be utilized for comparing numbers encoded in other binary codes so long as the code has the inherent property that the relative magnitudes of two numbers is indicated by the sense of the nonidentity of the most significant dissimilar digits. For example, where the numbers to be compared are expressed in the reflected binary code, the relative magnitudes of the two numbers are determined by the sense of the dissimilarity of the most significant nonidentical digits and the number of pairs of similar corresponding "1" digits more significant than the most significant dissimilar digits. Where the most significant dissimilarity occurs in the most significant digit place of the two numbers, or where there are zero or an even number of pairs of corresponding "1" digits more significant than the most significant dissimilar digits, the sense of the most significant nonidentity is a direct indication of the relative magnitudes of the two numbers. In this instance, the "1" digit of the dissimilar pair occurs in the larger of the two numbers, while the "0" digit of the dissimilar pair occurs in the smaller of the two numbers. On the other hand, where there are an odd number of pairs of corresponding "1" digits more significant than the most significant dissimilar digits, the sense of the most significant nonidentity is an inverse indication of the relative magnitudes of the two numbers, the "1" and "0" digits of the dissimilar pair occurring in the smaller and the larger, respectively, of the two numbers.

The above relationships may be expressed as Boolean logical equations in a manner similar to that for the weighted binary codes. Thus, where the nonidentity occurs in the most significant digit place:

$$A>B \text{ if } A_n\bar{B}_n=1$$
$$A<B \text{ if } \bar{A}_nB_n=1$$

where the system of notation is the same as that adopted for the weighted binary code.

Similarly, if the most significant nonidentity occurs in the next most significant digit place then:

$$A>B \text{ if } A_nB_n\bar{A}_{n-1}B_{n-1}+\bar{A}_n\bar{B}_nA_{n-1}\bar{B}_{n-1}=1$$
$$A<B \text{ if } A_nB_nA_{n-1}\bar{B}_{n-1}+\bar{A}_n\bar{B}_n\bar{A}_{n-1}B_{n-1}=1$$

Combining these equations yields:

$$A>B \text{ if } A_n\bar{B}_n+A_nB_n\bar{A}_{n-1}B_{n-1}+\bar{A}_n\bar{B}_nA_{n-1}\bar{B}_{n-1}=1$$
$$A<B \text{ if } \bar{A}_nB_n+A_nB_nA_{n-1}\bar{B}_{n-1}+\bar{A}_n\bar{B}_n\bar{A}_{n-1}B_{n-1}=1$$

The process of iteration and combination thus defined may be continued over as many digit places as desired. For example, for two three-digit numbers, the equations are $$A>B \text{ if } A_3\bar{B}_3+A_3B_3\bar{A}_2B_2+\bar{A}_3\bar{B}_3A_2\bar{B}_2+(A_3B_3A_2B_2+\bar{A}_3\bar{B}_3\bar{A}_2\bar{B}_2)A_1\bar{B}_1+(A_3B_3\bar{A}_2\bar{B}_2+\bar{A}_3\bar{B}_3A_2B_2)\bar{A}_1B_1=1 \quad (39)$$

$$A<B \text{ if } \bar{A}_3B_3+A_3B_3A_2\bar{B}_2+\bar{A}_3\bar{B}_3\bar{A}_2B_2+(A_3B_3A_2B_2+\bar{A}_3\bar{B}_3\bar{A}_2\bar{B}_2)\bar{A}_1B_1+(A_3B_3\bar{A}_2\bar{B}_2+\bar{A}_3\bar{B}_3A_2B_2)A_1\bar{B}_1=1 \quad (40)$$

where the 1 subscript indicates the least significant digits, the 2 subscript the next least significant digit and the 3 subscript the most significant digit.

It should be noted that $$A=B \text{ if } (A_3B_3+\bar{A}_3\bar{B}_3)(A_2B_2+\bar{A}_2\bar{B}_2)(A_1B_1+\bar{A}_1\bar{B}_1)=1$$

The equation expressing the relation of identity between two numbers may be separated into two equations, the first including all identities having zero or an even number of pairs of identical "1" digits, the second including all identities having an odd number of pairs of identical "1" digits, thusly:

$$A=B \text{ if } A_3B_3A_2B_2\bar{A}_1\bar{B}_1+A_3B_3\bar{A}_2\bar{B}_2A_1B_1+\bar{A}_3\bar{B}_3A_2B_2A_1B_1+\bar{A}_3\bar{B}_3\bar{A}_2\bar{B}_2\bar{A}_1\bar{B}_1=1 \quad (41)$$

or if $$A_3B_3\bar{A}_2\bar{B}_2\bar{A}_1\bar{B}_1+\bar{A}_3\bar{B}_3A_2B_2\bar{A}_1\bar{B}_1+\bar{A}_3\bar{B}_3\bar{A}_2\bar{B}_2A_1B_1+A_3B_3A_2B_2A_1B_1=1 \quad (42)$$

While it is possible to derive equations descriptive of any desired combinations of the above conditions of relative magnitude, the following combination is of particular interest because of the simplicity of the resulting equation and the structure required to mechanize it:

Adding "odd" equality Equation 42 to Equation 39 and applying the theorem $(B_1+\bar{B}_1)=1$ yields:

$$A\geqslant B \text{ if } A_3\bar{B}_3+A_3B_3\bar{A}_2B_2+\bar{A}_3\bar{B}_3A_2\bar{B}_2+(A_3B_3A_2B_2+\bar{A}_3\bar{B}_3\bar{A}_2\bar{B}_2)A_1+(A_3B_3\bar{A}_2\bar{B}_2+\bar{A}_3\bar{B}_3A_2B_2)\bar{A}_1=1 \quad (43)$$

Similarly, adding the "even" equality Equation 41, to Equation 40 yields $$A\leqslant B \text{ if } \bar{A}_3B_3+A_3B_3A_2\bar{B}_2+\bar{A}_3\bar{B}_3\bar{A}_2B_2+(A_3B_3A_2B_2+\bar{A}_3\bar{B}_3\bar{A}_2\bar{B}_2)\bar{A}_1+(A_3B_3\bar{A}_2\bar{B}_2+\bar{A}_3\bar{B}_3A_2B_2)A_1=1 \quad (44)$$

As will be later shown, these equation may be further reduced by appropriate expansion.

Equations descriptive of an embodiment of the invention designed to indicate the comparative relations $A \geqslant B$ and $A \leqslant B$ between two multidigit reflected binary numbers A and B, wherein the respective digits of the two numbers are supplied corresponding digits at the same time in the order of least significant digit first may be derived from the above equations following the procedure previously outlined. The embodiment will include a bistable element, and means for setting the bistable element to its "1" state for the condition $A \geqslant B$, and to its "0" state for the condition $A \leqslant B$, the "1" state indicating the "even" equalities, while the "0" state indicates the "odd" equalities. Ordinarily, as for example where numbers are being sorted, the inclusion of the equality relation in this manner will present no unique problem. However, where it is desired to distinguish further the equality condition, additional means for indicating such a relation between the numbers being compared may be included within the system.

Following the derivation procedure previously outlined, the left member of Equation 43 may be set equal to the right member of Equation 20, forming the equation:

$$A_3\bar{B}_3+A_3B_3\bar{A}_2B_2+\bar{A}_3\bar{B}_3A_2\bar{B}_2+(A_3B_3A_2B_2+\bar{A}_3\bar{B}_3\bar{A}_2\bar{B}_2)A_1+(A_3B_3\bar{A}_2\bar{B}_2+\bar{A}_3\bar{B}_3A_2B_2)\bar{A}_1 = (J_3\bar{J}_2+\bar{K}_3J_2)\bar{J}_1+(J_3K_2+\bar{K}_3\bar{K}_2)\bar{J}_1 \quad (45)$$

again assuming that the multivibrator is initially set to its "0" state.

The left side of this equation may, in accordance with basic theorems of propositional logic, be written as:

$$A_3\bar{B}_3+(A_3B_3\bar{A}_2B_2)(A_1+\bar{A}_1)+\bar{A}_3\bar{B}_3A_2\bar{B}_2(A_1+\bar{A}_1)+(A_3B_3A_2B_2+\bar{A}_3\bar{B}_3\bar{A}_2\bar{B}_2)A_1+(A_3B_3\bar{A}_2\bar{B}_2+\bar{A}_3\bar{B}_3A_2B_2)\bar{A}_1$$

by applying the theorem:

$$C(X+\bar{X})=C$$

Multiplying out the terms thus formed, and combining terms by applying the theorem $$X+\bar{X}=1$$

yields:

$$A_3\bar{B}_3+A_3B_3B_2A_1+A_3B_3\bar{A}_2\bar{A}_1+\bar{A}_3\bar{B}_3\bar{B}_2A_1+\bar{A}_3\bar{B}_3A_2\bar{A}_1$$

Repeating this process with respect to the first term, yields:

$$A_3\bar{B}_3+(A_3B_3\bar{A}_2B_2)(A_1+\bar{A}_1)+\bar{A}_3\bar{B}_3A_2\bar{B}_2(A_1+\bar{A}_1)+(A_3B_3A_2B_2+\bar{A}_3\bar{B}_3\bar{A}_2\bar{B}_2)A_1$$

which reduces to:

$$A_3B_2A_1+A_3\bar{A}_2\bar{A}_1+\bar{B}_3\bar{B}_2A_1+\bar{B}_3A_2\bar{A}_1$$

This expression may be factored into terms in $A_1$ and $\bar{A}_1$, resulting in the equation:

$$(A_3B_2+\bar{B}_3\bar{B}_2)A_1+(A_3\bar{A}_2+\bar{B}_3\bar{A}_2)\bar{A}_1 = (J_3\bar{J}_2+\bar{K}_3J_2)\bar{J}_1+(J_3K_2+\bar{K}_3\bar{K}_2)J_1 \quad (46)$$

If this equality is true, then it is true in particuflar for $$J_1=A_1 \qquad \bar{J}_1=\bar{A}_1$$
$$J_2=A_2 \qquad \bar{J}_2=\bar{A}_2$$
$$J_3=A_3$$
$$K_2=B_2 \qquad \bar{K}_2=\bar{B}_2$$
$$\bar{K}_3=\bar{B}_3$$

By expanding and reducing Equation 44, and making use of the $\bar{Q}_3$ equation corresponding to Equation 19 in a simliar manner, the zero setting equation for the embodiment is found to be:

$$(B_3\bar{B}_2+\bar{A}_3B_2)A_1+(B_3A_2+\bar{A}_3\bar{A}_2)\bar{A}_1 = (\bar{J}_3K_2+K_3\bar{K}_2)J_1+(K_3J_2+\bar{J}_3\bar{J}_2)\bar{J}_1 \quad (47)$$

If this equality is true, then, for example, it is true for $$J_1=A_1 \qquad \bar{J}_1=\bar{A}_1$$
$$J_2=A_2 \qquad \bar{J}_2=\bar{A}_2$$
$$\bar{J}_3=\bar{A}_3$$
$$K_2=B_2 \qquad \bar{K}_2=\bar{B}_2$$
$$K_3=B_3$$

The above identities are therefore both satisfied if $$J_1=A_1$$
$$J_2=A_2 \qquad K_2=B_2$$
$$J_3=A_3 \qquad K_3=B_3$$

Since the term $K_1$ appears in neither identity, $K_1$ is undefined, and may accordingly be assigned any value. For purposes of symmetry $K_1$ will be set equal to $B_1$.

The above equations thus imply that the comparison operation may be carried out by applying a signal to the J input of the bistable element during the first interval of time if $A_1$ exists, at the same time applying a signal to the K input if $B_1$ exists; to the J input during the second interval of time if $A_2$ exists, and to the K input during the second interval if $B_2$ exists, etc. An embodiment of the invention mechanized according to the above principles is shown in Figure 6.

Figure 6:
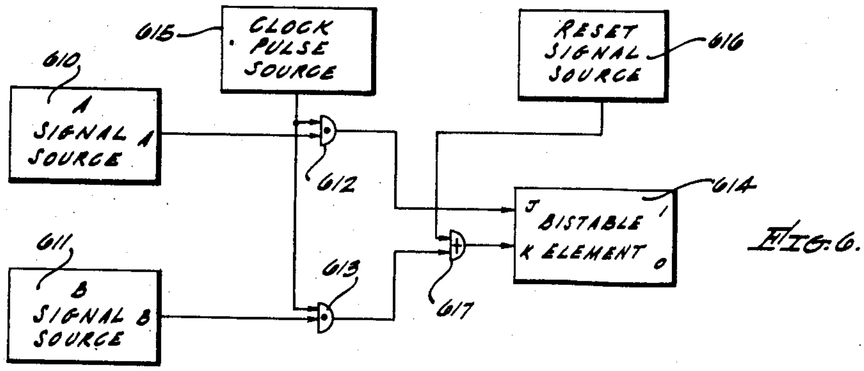
Figure 6 is a block diagram of a comparator according to this invention for serially comparing two reflected binary numbers, least significant digits first.

As shown in Figure 6, the comparator includes a pair of signal sources 610 and 611 for supplying input signals A and B, respectively, representing in bilevel voltage form successive digits of the first and second numbers to be compared, to a pair of logical "and" networks 612 and 613 which, in turn supply output signals to the J and K input terminals, respectively, of a bistable element 614. A clock pulse source 615 supplies clock pulses to each of logical networks 612 and 613 while a reset signal source 616 is connected through an "or" network 617 to supply reset signals to the K input of bistable element 614.

More specifically, each of input signal sources 610 and 611 produces relatively high and low voltage level signals on its output terminal when the signal supplied represents "1" and "0" digits, respectively. Logical "and" networks 612 and 613, which may be similar to the logical "and" networks described in connection with the embodiment of the invention shown in Figure 2, receive input signals A and B, respectively, and a clock pulse signal from clock pulse source 615 and pass applied clock pulses to their output terminals whenever the signal applied to their other input terminal is of relatively high voltage level. Bistable element 614, which may be the conventional flip-flop previously described, has its J input terminal connected to the output terminal of logical network 612 and its K input terminal connected to the output terminal of logical network 617. Logical network 617 has two input terminals connected to reset signal source 616 and the output terminal of network 613, respectively. Alternatively, networks 613 and 617 may be replaced by a clock pulse "or" network similar to that described in Fig. 2, and use made of a voltage level, rather than pulse, reset signals.

Considering now the response of the system thus described when used to compare two multidigit reflected binary numbers A and B, bistable element 614 may initially be set to its "0" state by means of a reset signal applied to its K input terminal from source 616. To carry out the comparison operation sources 610 and 611 may apply the signals representing the two numbers to each of networks 612 and 613 in the order of least significant digit signals first, corresponding digit signals being applied at the same time. Simultaneously with the application of each pair of input digit signals, clock pulse source 615 applies a clock pulse to each of networks 612 and 613. If the corresponding digit signals of the two numbers are dissimilar bistable element 614 will be set to a state indicative of the sense of the dissimilarity. On the other hand, if the digit signals represent similar "1" digits, the state of the bistable element will be reversed or triggered. If the similar digit signals represent corresponding "0" digits no pulse will be passed by either of networks 612 or 613 and accordingly, the bistable element will remain in its original state.

It will thus be seen that the state of the bistable element after all digits of the two numbers being compared have been applied will be dependent on the sense of the nonidentity of the most significant nonidentical pair of corresponding digits and the number of similar corresponding pairs of "1" digits more significant than the most significant dissimilarity. Thus, where the most significant dissimilarity occurs in the most significant digit place of the two numbers or where the most significant dissimilar pair of digits is followed in the order of increasing significance by an even number of pairs of corresponding similar "1" digits the bistable element will directly indicate the sense of the most significant dissimilarity. Where the most significant dissimilar pair of digits is followed by and odd number of pairs of similar "1" digits the bistable element at the conclusion of the comparison process will be in a state opposite to that for which it was set by the most significant dissimilar pair of digits which is again, however, a direct indication of the relative magnitudes of the two numbers. Where the two numbers being compared are identical, the bistable element may be in either its "0" or "1" state at the conclusion of the comparison process depending on the number of similar corresponding "1" digits of the two numbers. Accordingly, a "1" indication of the bistable element at the conclusion of the comparison operation may be interpreted as indicating $A \geqslant B$, while a "0" indication indicates the condition $A \leqslant B$. The response of the system is thus seen to be entirely in accordance with that postulated from the defining equation.

Where it is desired to recognize uniquely the condition of identity of the two numbers being compared other schemes well known in the prior art may be utilized.

Equations descriptive of an embodiment of the invention for indicating the comparative relations $A \geqslant B$ and $A \leqslant B$ between two multidigit reflected binary numbers A and B wherein the respective digits of the two numbers are supplied corresponding digits at the same time in the order of most significant digit first may be derived from Equations 43 and 44 following the procedure previously outlined. The embodiment will include a bistable element such as an Eccles-Jordan flip-flop and means for setting the bistable element to its "1" state for the condition $A \geqslant B$ and to its "0" state for the condition $A \leqslant B$, the "1" state indicating the "even" equalities while the "0" state indicates the "odd" equalities.

It should be noted that under this mode of application of the digits the relative magnitudes of the two numbers is established as soon as nonidentical digits are applied to the comparator and, accordingly, the comparator must include means for inhibiting the response of the bistable element to the application of further digit signals once a nonidentity occurs.

Proceeding now with the derivation of equations descriptive of the desired embodiment, Equations 43 and 44 may be rewritten so that the first applied or most significant digits have a 1 subscript, the second applied a 2 subscript, etc. yielding:

$$A \geqslant B \text{ if } A_1\bar{B}_1+A_1B_1\bar{A}_2B_2+\bar{A}_1\bar{B}_1A_2\bar{B}_2+(A_1B_1A_2B_2 +\bar{A}_1\bar{B}_1\bar{A}_2\bar{B}_2)A_3+(A_1B_1\bar{A}_2\bar{B}_2+\bar{A}_1\bar{B}_1A_2B_2)\bar{A}_3=1 \quad (48)$$

$$A \leqslant B \text{ if } \bar{A}_1B_1+A_1B_1A_2\bar{B}_2+\bar{A}_1\bar{B}_1\bar{A}_2B_2+(A_1B_1A_2B_2 +\bar{A}_1\bar{B}_1\bar{A}_2\bar{B}_2)\bar{A}_3+A_1B_1\bar{A}_2\bar{B}_2+\bar{A}_1\bar{B}_1A_2B_2)A_3=1 \quad (49)$$

Following the derivation procedure previously outlined the left member of Equation 48 may be set equal to the right member of Equation 20 forming the equation:

$$A_1\bar{B}_1+A_1B_1\bar{A}_2B_2+\bar{A}_1\bar{B}_1A_2\bar{B}_2+(A_1B_1A_2B_2 +\bar{A}_1\bar{B}_1\bar{A}_2\bar{B}_2)A_3+(A_1B_1\bar{A}_2\bar{B}_2+\bar{A}_1\bar{B}_1A_2B_2)\bar{A}_3 =(J_3\bar{J}_2+\bar{K}_3J_2)\bar{J}_1+(J_3K_2+\bar{K}_3\bar{K}_2)J_1 \quad (50)$$

While Equation 50 may be considered as a basic defining equation for the system, the appropriate J and K signals may be most conveniently determined if the terms of the equality are rearranged by appropriate logical manipulation.

Thus, considering the left member of Equation 50, terms identical to zero may be added, and the resulting expression factored to yield:

$$A_1(A_1\bar{B}_1+\bar{A}_1B_1)+(A_1B_1+\bar{A}_1\bar{B}_1)(A_2\bar{B}_2 +\bar{A}_2B_2)(A_1\bar{A}_2+\bar{A}_1A_2)+(A_1B_1+\bar{A}_1\bar{B}_1)(\mathrm{A}_2\mathrm{B}_2 +\bar{A}_2\bar{B}_2)(A_1\bar{A}_2\bar{A}_3+\bar{A}_1A_2\bar{A}_3+\bar{A}_1\bar{A}_2A_3+A_1A_2A_3) \quad (51)$$

This expression in turn may be factored into two terms having $A_1$ and $\bar{A}_1$ coefficients, yielding:

$$[(A_1\bar{B}_1+\bar{A}_1B_1)+\bar{A}_2(A_1B_1+\bar{A}_1\bar{B}_1)(A_2\bar{B}_2+\bar{A}_2B_2) +\bar{A}_2\bar{A}_3(A_1B_1+\bar{A}_1\bar{B}_1)(A_2B_2+\bar{A}_2\bar{B}_2) +A_2A_3(A_1B_1+\bar{A}_1\bar{B}_1)(A_2B_2+\bar{A}_2\bar{B}_2)]A_1 +[A_2(A_1B_1+\bar{A}_1\bar{B}_1)(\bar{A}_2B_2+A_2\bar{B}_2)+A_3(A_2B_2 \bar{A}_2\bar{B}_2)+\bar{A}_2A_3(A_1B_1+\bar{A}_1\bar{B}_1)(A_2B_2+\bar{A}_2\bar{B}_2)]\bar{A}_1 \quad (52)$$

Applying the theorem $$X+\bar{X}Y=X+Y$$

to this expression, and reinserting the reduced expression in Equation 50 yields:

$$[(A_1\bar{B}_1+\bar{A}_1B_1)+A_2(A_2\bar{B}_2+\bar{A}_2B_2)+\bar{A}_2\bar{A}_3 +A_2A_3(A_1B_1+\bar{A}_1\bar{B}_1)(A_2B_2+\bar{A}_2\bar{B}_2)]A_1 +[A_2(A_1B_1+\bar{A}_1\bar{B}_1)((\bar{A}_2B_2+A_2\bar{B}_2)+\bar{A}_3) +A_2A_3(A_1B_1+\bar{A}_1\bar{B}_1)(A_2B_2+\bar{A}_2\bar{B}_2)]\bar{A}_1 =(\bar{K}_3\bar{K}_2+J_3K_2)J_1+(\bar{K}_3J_2+J_3\bar{J}_2)\bar{J}_1 \quad (53)$$

If this identity is true, then it is true in particular for $J_1=\mathrm{A}_1$ $\quad$ $\bar{J}_1=\bar{A}_1$ $J_2=A_2(A_1B_1+\bar{A}_1\bar{B}_1)$ $\quad$ $\bar{J}_2=\bar{A}_2+(A_1\bar{B}_1+\bar{A}_1B_1)$ $J_3=A_3(A_2B_2+\bar{A}_2\bar{B}_2)(A_1B_1+\bar{A}_1\bar{B}_1)$ $K_2=A_2(A_1B_1+\bar{A}_1\bar{B}_1)$ $\bar{K}_3=\bar{A}_3(A_2\bar{B}_2+\bar{A}_2B_2)+(A_1\bar{B}_1+\bar{A}_1B_1)$ $\bar{K}_2\bar{K}_3=(A_1\bar{B}_1+\bar{A}_1B_1)+\bar{A}_2(A_2\bar{B}_2+\bar{A}_2B_2)+\bar{A}_2\bar{A}_3$ The values of $\bar{J}_2$ and $\bar{K}_3$ each include a term not present in Equation 53, namely $A_1\bar{B}_1+\bar{A}_1B_1$. These terms must be included in order that $\bar{J}_2$ be the complement of $J_2$, and that $\bar{K}_2\bar{K}_3$ be the product of the complement of $\bar{K}_2$ and $\bar{K}_3$. The inclusion of these terms does not, however, modify Equation 53, amounting merely to the addition of zero terms. Since $K_1$ is not defined by the equation, it may be given any value; for convenience and symmetry, $K_1$ will be given the value $A_1$.

While it is possible to derive a similar set of equalities from the zero setting code and flip-flop expansion formulas, in a manner similar to that discussed in connection with the embodiment of the invention shown in Fig. 2, such equalities will be found to be consistent with the equalities previously derived. Any additional defining equalities which would appear may as conveniently be derived by complementing the appropriate equalities already found.

Following this procedure, the J and K inputs over three intervals of time are:

$J_1=A_1$ $\quad$ $\bar{J}_1=\bar{A}_1$ $J_2=A_2(A_1B_1+\bar{A}_1\bar{B}_1)$ $\quad$ $\bar{J}_2=\bar{A}_2+(A_1\bar{B}_1+\bar{A}_1B_1)$ $J_3=A_3(A_2B_2+\bar{A}_2\bar{B}_2)(A_1B_1+\bar{A}_1\bar{B}_1)$ $\bar{J}_3=\bar{A}_3+(A_2\bar{B}_2+\bar{A}_2B_2)+(A_1\bar{B}_1+\bar{A}_1B_1$ $K_1=A_1$ $\quad$ $\bar{K}_1=\bar{A}_1$ $K_2=A_2(A_1B_1+\bar{A}_1\bar{B}_1)$ $\quad$ $\bar{K}_2=\bar{A}_2+(A_1\bar{B}_1+A_1B_1)$ $K_3=A_3(A_2B_2+\bar{A}_2\bar{B}_2)(A_1B_1+\bar{A}_1\bar{B}_1)$ $\bar{K}_3=\bar{A}_3+(A_2\bar{B}_2+\bar{A}_2B_2)+(A_1\bar{B}_1+\bar{A}_1B_1)$ It may be noted that the J and K signals for any particular instant in time are identical.

The above equations thus imply that the comparison operation may be carried out by applying a signal to the J and K inputs during the first interval of time if $A_1$ exists, during the second interval of time if $A_2$ exists and the previously occurring corresponding digit signals were identical, during the third interval of time if $A_3$ exists and the previously occurring corresponding digit signals were identical, etc. Similarly, the barred terms imply that no signal be applied to the J and K inputs during the first interval of time if $\bar{A}_1$ exists, during the second interval of time if $\bar{A}_2$ exists or the previously occurring corresponding digit signals were nonidentical, etc.

The signals applied to the J and K inputs during any particular interval of time will thus be seen to include an A signal having the time subscript of the particular interval in time and a signal derived from previously occurring or more significant digits. Similarly, the $\bar{J}$ and $\bar{K}$ terms, which imply the nonapplication of input signals, likewise include an $\bar{A}$ digit having the same time subscript as the $\bar{J}$ and $\bar{K}$ terms, and other terms formed from previously occurring or more significant digits. As will be shown in the embodiment described below, the logical operation of forming the required prior digit signals and the storage of the formed terms may be performed most conveniently by means of an additional bistable element. The terms having the same time subscript may as before be formed by means of logical networks.

Figure 7:
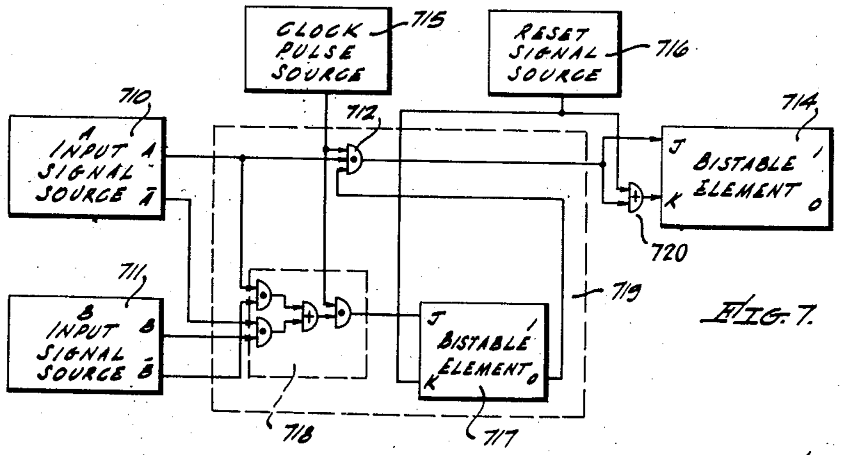
Figure 7 is a block diagram of a comparator for comparing two reflected binary numbers serially, most significant digits first.

Referring now to Figure 7, there is shown another embodiment of the present invention mechanized according to the above principles. As shown in Figure 7, the comparator includes a pair of signal sources 710 and 711 for supplying complementary input signals, A, $\bar{A}$, and B, $\bar{B}$, respectively, to a logical gating matrix 719 which in turn supplies its output signals to a bistable element 714 for indicating the result of the comparison operation. More specifically, input signal sources 710 and 711 are similar to input signal sources 210 and 211 discussed in relation to the embodiment of the invention shown in Fig. 2, except that the numbers represented by the digit signals are reflected binary numbers and the digit signals supplied by these sources are now supplied in the order of most significant digit signal first. Logical gating matrix 719 includes a logical "and" network 712, a logical gating network 718 and a bistable element 717.

Logical gating network 718 receives input signals A, $\bar{A}$, B and $\bar{B}$, and has its elements so arranged that a clock pulse from source 715 will be passed to the output terminal of the network whenever the input digit signals supplied by sources 710 and 711 are nonidentical. The output terminal of logical gating network 718 in turn is connected to the J input terminal of bistable element 717 which has its "0" output terminal connected to one of the input terminals of logical "and" network 712. The K input terminal of bistable element 717 is connected to a source of reset signals 716. Logical "and" network 712, which may be similar to the logical "and" networks heretofore described in connection with other embodiments of the present invention, also receives as input signals the A signal produced by signal source 710 and a clock pulse from clock pulse source 715. Network 712 responds to the simultaneous application of input signals to its input terminals to pass the clock pulse to its output terminal, which in turn is connected to the J input terminal of bistable element 714, and to one of the inputs of a two-input logical "or" network 720. Logical "or" network 720 has its remaining input terminal connected to reset signal source 716, and passes a signal applied to either of its input terminals to its output terminal, which is connected to the K input terminal of bistable element 714.

Considering now the response of the system thus described when used to compare two multidigit reflected binary numbers A and B, bistable element 714 and 717 may initially be set to their "0" state by means of a reset signal from reset signal source 716. To carry out the comparison operation sources 710 and 711 may apply the signals representing the two numbers to logical gating matrix 719 in the order of most significant digit signals first, corresponding digit signals being applied at the same time. Simultaneously with the application of each pair of input digit signals, clock pulse source 715 applies a clock pulse to logical "and" network 712 and logical gating network 718.

So long as the corresponding digit signals are identical, logical gating network 718 will produce no output signal and bistable element 717 will remain in its "0" state. Accordingly, logical "and" network 712 will be responsive to the occurrence of "1" digit signals on the A output terminal of source 710 to pass a clock pulse to the input terminal of bistable element 714. These input pulses will trigger bistable element 714 from one to the other of its stable states. Upon the occurrence of a nonidentity between corresponding digit signals supplied by source 710 and 711, logical gating network 718 will pass a clock pulse, which will set bistable element 717 to its "1" state, thereby producing a "0" output signal on its output terminal and accordingly, on one of the input terminals of logical "and" network 712. Accordingly, "and" network 712 will not again pass clock pulses regardless of the input signal applied to its other input terminal, and bistable element 714 will remain in the state to which it had been triggered prior to the occurrence of the nonidentical digit signals. Because of the inherent delay in the response of bistable element 717, if the nonidentical digits which trigger bistable element 717 are A and $\bar{B}$ signals, the A signal will cause a clock pulse to be passed by network 712 and trigger bistable element 714 before the output signal from bistable element 717 falls to its "0" level.

The system described is thus seen to meet the requirements called for by the equations previously derived, and accordingly the final setting of bistable element 714 may be interpreted if a "1" setting, as indicating $A \geqslant B$, while if a "0" setting as indicating $A \leqslant B$. It should be noted that the relative magnitudes of the two numbers is established once bistable element 717 has been set to its "1" state, and that the application of further digit signals may be discontinued once the element is so set. It may also be noted that the conditions $A>B$, $A<B$ and $A=B$ may be distinguished by observing the final setting of bistable elements 714 and 717. Thus, if bistable element 717 is in its "1" state after all of the digits of the two numbers have been applied, the setting of bistable element 714 to a "1" state may be interpreted as indicating $A>B$ and to a "0" state as indicating $A<B$. On the other hand, if after all of the digit signals have been applied bistable element 717 remains in its "0" state, the condition $A=B$ is indicated regardless of the setting of bistable element 714.

While it is possible to derive equations descriptive of other embodiments of the present invention, it is considered that the previous discussion is sufficiently illustrative of the general procedure to be followed and accordingly, no such derivation will be set forth with respect to the embodiments which follow. Instead, use will be made of the general principles developed in the previous derivations.

For example, if it is desired to mechanize an embodiment of the present invention to provide for the comparison of two reflected binary numbers A and B wherein the respective digits of the two numbers are supplied corresponding digits at the same time in the order of most significant digit first, use may again be made of Equation 39 and 40. Rewriting these equations so that the first applied or most significant digits have a 1 subscript, the second applied a 2 subscript, etc., yields:

$$A>B \text{ if } A_1\bar{B}_1+A_1B_1\bar{A}_2B_2+\bar{A}_1\bar{B}_1A_2\bar{B}_2 +(A_1B_1A_2B_2+\bar{A}_1\bar{B}_1\bar{A}_2\bar{B}_2)A_3\bar{B}_3 +(A_1B_1\bar{A}_2\bar{B}_2+\bar{A}_1\bar{B}_1A_2B_2)\bar{A}_3B_3=1 \quad (54)$$

$$A<B \text{ if } \bar{A}_1B_1+A_1B_1A_2\bar{B}_2+\bar{A}_1\bar{B}_1\bar{A}_2B_2 +(A_1B_1A_2B_2+\bar{A}_1\bar{B}_1\bar{A}_2\bar{B}_2)\bar{A}_3B_3 +(A_1B_1\bar{A}_2\bar{B}_2+A_1B_1\bar{A}_2\bar{B}_2)A_3\bar{B}_3=1 \quad (55)$$

It can be seen that each term in Equation 54 includes an odd number of "1" digits for A, and zero or an even number of "1" digits for B, while each term in Equation 55 includes zero or an even number of "1" digits for A, and an odd number of "1" digits for B. Extension of these equations to cover numbers of greater digit length would show that this "odd-even" relationship is maintained regardless of the digit length of the numbers being compared.

It may also be noted that if the digits of the numbers are considered in the order of most significant digit first, the relative magnitude of the two numbers is established once a dissimilar pair of corresponding digits is reached, and no further or less significant digits need be considered.

In a similar manner Equations 41 and 42 may be rewritten so that the first applied or most significant digits have a 1 subscript, the second applied a 2 subscript, etc., yielding:

$$A=B \text{ if } A_1B_1A_2B_2\bar{A}_3\bar{B}_3+A_1B_1\bar{A}_2\bar{B}_2A_3B_3 +\bar{A}_1\bar{B}_1A_2B_2\bar{A}_3\bar{B}_3+\bar{A}_1\bar{B}_1\bar{A}_2\bar{B}_2\bar{A}_3\bar{B}_3=1 \quad (56)$$

and $$A_1B_1\bar{A}_2\bar{B}_2\bar{A}_3\bar{B}_3+\bar{A}_1\bar{B}_1A_2B_2\bar{A}_3\bar{B}_3 +\bar{A}_1\bar{B}_1\bar{A}_2\bar{B}_2A_3B_3+A_1B_1A_2B_2A_3B_3=1 \quad (57)$$

It has been previously noted that each of the terms of the first equation contain zero or an even number of pairs of identical "1" digits for both A and B while each of the terms of the second equation contains an odd number of identical "1" digits for both A and B. It is obvious that these equations could be extended to cover identical numbers of greater digit length while at the same time, maintaining the "odd-even" relationship of the terms.

The basic combination of the present invention may be mechanized to take into account the above principles by including as the "means associated with the bistable element," logical networks including additional bistable elements to perform the required logical operations on the applied digit signals in accordance with the "odd-even" relationship discussed above. In addition, it will be later shown that these logical networks may themselves be utilized to carry out the comparison operation where certain ambiguities in the comparison indication may be tolerated. It will further be pointed out how these logical networks include all of the elements of the basic combination and may, therefore, be considered to represent an alternative embodiment of the present invention.

Figure 8:
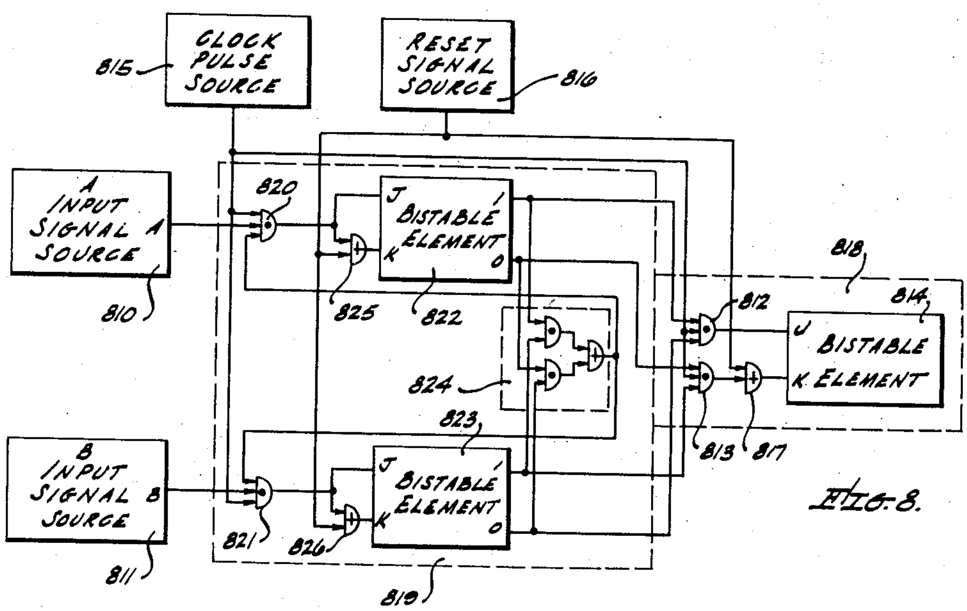
Figure 8 is a block diagram of another comparator for comparing two reflected binary numbers, most significant digits first.

Another embodiment of the present invention mechanized according to these principles which provides for the comparison of two reflected binary numbers, A and B, wherein the signals representing the digits of the two numbers are applied sequentially, most significant digit first, is shown in Fig. 8.

As shown in Fig. 8, the comparator includes a pair of input signal sources 810 and 811 for supplying input signals A and B, respectively; a comparator network 818; and a logical gating matrix 819, responsive to the signals from sources 810 and 811 and to a clock or comparison pulse from a clock pulse source 815, for controlling the operation of comparator network 818. More specifically, input signal sources 810 and 811 are similar to input signal sources 610 and 611 shown in Fig. 6, except that the respective digit signals of the two numbers are now supplied in the order of most significant digit signal first.

Logical gating matrix 819 includes logical "and" networks 820 and 821 which receive input signals A and B, respectively, a pair of bistable elements 822 and 823, and a logical gating network 824. The output signals of bistable elements 822 and 823 are applied to comparator network 818, and to logical gating network 824 which, in turn, applies its output signal to logical "and" networks 820 and 821. Logical "and" networks 820 and 821, which may be similar to the "and" networks heretofore described, also receive clock pulses from clock pulse source 815 and have their inputs so arranged that the clock pulses from source 815 are passed whenever "1" signals are applied to the remaining input terminals of each network. The output signals of the logical "and" networks are applied to the J and K inputs of bistable elements 822 and 823, respectively, the signals to the K inputs being applied through two-terminal logical "or" networks 825 and 826, respectively. The remaining input terminal of each of logical "or" networks 825 and 826 is connected to a source of reset signals 816. The bistable elements, in turn, produce complementary output signals X, $\bar{X}$ and Y, $\bar{Y}$, respectively, on their "1" and "0" output terminals.

Logical gating network 824 is so arranged that whenever bistable elements 822 and 823 are in the same stable state, the output of the logical gating network is of comparatively high voltage level, while whenever the bistable elements are in dissimilar states, the output is of comparatively low voltage level. The mechanization of logical gating network 824 to produce this response is, therefore, in accordance with the logical relation $XY+\bar{X}\bar{Y}$ as has been previously discussed in connection with the embodiment of the invention shown in Fig. 4. The output of gating network 824 is returned to logical "and" network 820 and 821.

Comparator network 818 is a network substantially identical in structure and response to the embodiment of the invention shown in Fig. 2. In other words, comparator network 818 includes a bistable element 814, a pair of logical "and" networks 812 and 813, and a logical "or" network 817. Since the reset signals from source 816 are pulse and not voltage level signals, however, clock pulse source 815 is connected to one of the inputs of logical network 813, which is a three-input logical "and" network. The output of network 813 is connected to the K input of bistable element 814 through two-input logical "or" network 817, which also receives reset signals from source 816 on its remaining input. Alternatively, where a voltage level reset signal is available, comparator network 818 may be replaced by a network identical to that shown in Fig. 2.

Considering now the response of the comparator thus described when used to compare two multidigit reflected binary numbers A and B, bistable elements 822, 823 and 814 may initially be set to their "0" state by means of reset signals from source 816. To carry out the comparison operation, sources 810 and 811 may apply the signals representing the two numbers to each of logical networks 820 and 821 in the order of most significant digit signals first, corresponding digit signals being applied at the same time. Simultaneously with the application of each pair of input digit signals, clock pulse source 815 applies a clock pulse to each of logical networks 820 and 821 and to comparator network 818.

If the digit signals being applied represent corresponding "0" digits, no response occurs within the system. If the digit signals being applied represent corresponding "1" digits, logical "and" networks 820 and 821 produce output clock pulse signals, which trigger bistable elements 822 and 823 to the other of their two stable states. As long as the digit signals are identical, the system will continue to respond to the applied signals in this manner. Since both bistable elements are triggered to the same stable state at the same time, logical gating network 824 continues to produce a "1" output signal, and therefore logical networks 820 and 821 continue to produce output signals when corresponding "1" digit signals are applied.

However, as soon as dissimilar digit signals are applied, only the bistable element which receives the "1" digit of the dissimilar pair will be triggered, and bistable elements 822 and 823 will be in dissimilar states. When this condition obtains, the output of logical gating network 824 falls to a comparatively low voltage level, and logical networks 820 and 821 will "close," thereafter producing no output signals. Bistable element 814 will be set to a state indicating the sense of the dissimilarity between bistable elements 822 and 823 by the next clock pulse signal, due to the inherent delay in the response of the bistable elements. If bistable element 822 is in its "1" state, and bistable element 823 is in its "0" state, bistable element 814 will be set to its "1" state, while if bistable element 822 is in its "0" state, and bistable element 823 is in its "1" state, bistable element 814 is set to its "0" state. As will be shown, the state of bistable element 814 may be interpreted as an indication of the relative magnitudes of the two numbers.

It will be seen that the final settings of bistable elements 822 and 823 are direct indications of an odd or an even number of applied "1" digit signals for the numbers A and B, respectively. A "0" setting of each element indicates that "0" or an even number of "1" digit signals have been applied, while a "1" setting indicates that an odd number of "1" digit signals have been applied. Once a nonidentity occurs, bistable elements 822 and 823 will be locked in dissimilar states and, as has been previously discussed, the setting of these elements from an odd or even standpoint will uniquely determine which of Equations 54 or 55 has been satisfied.

Bistable element 814 in turn will indicate the sense of the nonidentity between bistable elements 822 and 823 and thus indicate which of the Equations 54 or 55 has been satisfied. More particularly, a "1" setting of bistable element 814 will indicate that bistable element 822 has been set to its "1" state while bistable element 823 has been set to its "0" state. From the previous discussion, it will be seen that the input signals applied must have been represented by a term in Equation 54 and, therefore, the "1" setting of bistable element 814 indicates that $A>B$. In a similar manner, it will be seen that a "0" setting of bistable element 814, once a nonidentity has occurred, must correspond to one of the terms in Equation 55, thereby indicating the condition $A<B$.

It should be noted that if the two numbers being compared are identical, bistable element 814 will not be set by a nonidentity since none occurs and accordingly, the element will remain in its initial state. This initial state must therefore be interpreted as indicating either that the numbers are identical or that they are of relative magnitudes in the sense heretofore noted.

For example, under the mode of operation previously described, the "0" setting of bistable element 814 must be interpreted as indicating $A\leq B$ while the "1" setting indicates the condition $A>B$. It may also be noted that if bistable element 814 is originally set to its "0" state, it will be changed from that setting only if nonidentical signals representing the condition $A>B$ are applied to the system and that once the element is so set, the element will not be returned to its "0" setting unless a reset signal is again applied. It is clear, therefore, that the logical network associated with the K input of bistable element 814 may be omitted from the system entirely. With such a mechanization of the system, the K input terminal of bistable element 814 may be most conveniently returned to a source of reset signals, the reset signals being applied prior to the initiation of the comparison operation.

Where a certain amount of ambiguity may be tolerated in the indication of relative magnitudes furnished by the comparator, the embodiment shown in Fig. 8 may be modified by omitting comparator circuit 818 and the comparison indication considered to be presented by the setting of bistable element 822. The indication of this element after all digits of the two numbers to be compared have been applied to the comparator may be interpreted as indicating the relative magnitudes of two numbers in exactly the same sense as that afforded by the embodiment of the invention shown in Fig. 6. In other words, a "1" setting of bistable element 822 indicates the condition $A\geqslant B$ while a "0" setting of bistable element 822 indicates the condition $A\leqslant B$. This interpretation of the significance of the setting of bistable element 822 will be seen to follow directly from the discussion of the comparator previously outlined. It may also be noted that the comparator thus postulated includes all of the elements present in the basic combination of the present invention and may, therefore, be considered to represent another embodiment of the present invention.

The number of elements required to mechanize the comparator shown in Fig. 8 may also be reduced by eliminating redundant elements in logical gating network 824. If the "0" and "1" states of bistable elements 822 and 823 are denominated by $\bar{X}$, X, and $\bar{Y}$, Y, respectively, then as can be seen from Fig. 8, the input signals to bistable element 822 are:

$$J_t=A_t(X_{t-1}Y_{t-1}+\bar{X}_{t-1}\bar{Y}_{t-1}) \tag{58}$$

and $$K_t=A_t(X_{t-1}Y_{t-1}+\bar{X}_{t-1}\bar{Y}_{t-1}) \tag{59}$$

where $t$ and $t-1$ refer to particular intervals in time.

These functions may be simplified by recognizing that the bistable element will have the desired response if signals are applied to the J input terminal only when it is desired to change the bistable element from its "0" to its "1" state, and to the K input terminal only when it is desired to change the bistable element from its "1" to its "0" state. Equation 58 may accordingly be reduced by including only those terms which apply when the bistable element was previously in its "0" state. Therefore, setting $\bar{X}_{t-1}=1$, and $X_{t-1}=0$, Equation 58 reduces to:

$$J_t=A_t\bar{Y}_{t-1} \tag{60}$$

In a similar manner, with $X_{t-1}=1$, and $\bar{X}_{t-1}=0$, Equation 59 reduces to:

$$K_t=A_tY_{t-1} \tag{61}$$

In a similar manner the required input signals for bistable element 823 may be found to be:

$$J_t=B_tX_{t-1} \tag{62}$$

$$K_t=B_t\bar{X}_{t-1} \tag{63}$$

Figure 9:
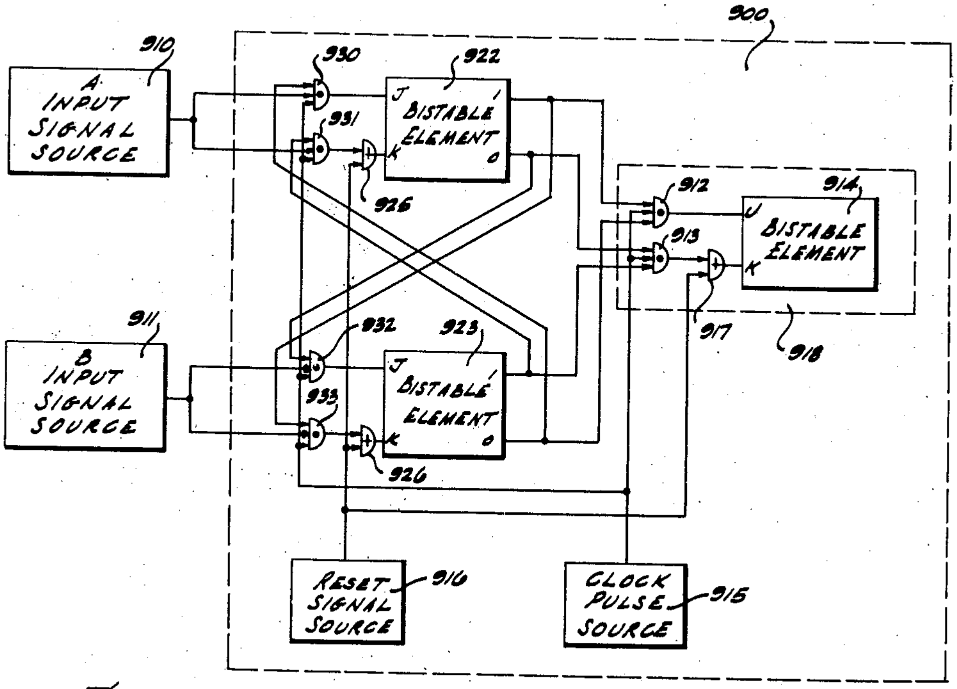
Figure 9 is a block diagram of an embodiment which is a variation of the embodiment shown in Figure 8.

A comparator mechanized according to these principles is shown in Fig. 9. As shown in Fig. 9, the comparator includes input signal sources 910 and 911 for supplying input signals A and B, respectively, to four logical "and" networks, 930, 931, 932 and 933 which, in turn, supply their output signals to a pair of bistable elements 922 and 923. The output signals from bistable elements 922 and 923 and clock or comparison pulses from a clock pulse source 915 are applied to a comparator network 918 as well as to the logical "and" networks.

More specifically, input signal sources 910 and 911 are similar to the input signal sources described in connection with the embodiment of the invention shown in Fig. 8, presenting their respective digit signals in the order of most significant digit first. Logical "and" networks 930 through 933, which may be similar to the diode "and" networks heretofore described, each has three input terminals for receiving an input signal from the appropriate input signal source, a clock or comparison pulse from source 915 and a signal from one of the output terminals of either bistable element 922 or 923. Each "and" networks supplies its output signal to the appropriate J or K input terminal of bistable elements 922 or 923 in accordance with the logical formulas heretofore derived. Thus, logical "and" network 930, which performs the logical operation specified by Equation 60, receives input signal A from input signal source 910, clock pulse signals from source 915 and $\bar{Y}$ signals from the "0" output terminal of bistable element 923; and applies its output signal to the J input terminal of bistable element 922. The signals from "and" networks 931 and 933 are applied to the K input terminals of bistable elements 922 and 923, respectively, through two-terminal "or" networks 925 and 926, respectively, which have their remaining input terminal connected to reset signal source 916. Reset signal source 916 also supplies reset signals to comparator network 918. Networks 931, 932, and 933 are mechanized in a similar manner in accordance with Equations 61, 62 and 63.

Bistable elements 922 and 923, which may be the conventional bistable elements heretofore described, also apply their output signals to comparator network 918 which is identical to network 818 heretofore described. The correspondence between the comparator network and the basic combination of the present invention has already been noted.

The response of the comparator thus described, insofar as the indication of bistable elements 922, 923 and 914 is concerned, is identical to that of Fig. 8. However, the manner in which bistable elements 922 and 923 are set to their respective stable states, and the manner in which the application of further input signals is inhibited once a nonidentity occurs is different from the embodiment previously discussed.

Initially all of the bistable elements may be set to their "0" states by means of reset signals from reset signal source 916. In carrying out the comparison operation, input signal sources 910 and 911 apply input signals to the logical networks to which they are connected. Simultaneously with the application of each pair of corresponding digit signals, a clock or comparison pulse is supplied by source 915. In response to identical "0" digits supplied by both input signal sources, no response takes place within the system. However, identical "1" digit signals render networks 930 and 932 operable to set bistable elements 922 and 923 to their "1" stable states. If both bistable elements 922 and 923 are in their "1" state, the application of corresponding "1" digit input signals will cause networks 931 and 933 to produce "1" output signals and both of the bistable elements will be set to their "0" states. Under each of these conditions of operation, the remaining two networks will not produce output signals since each is receiving a "0" input signal from the associated bistable element. Insofar as the setting of the bistable elements are concerned, however, their response is seen to be identical to that of bistable element 822 and 823 of the embodiment shown in Fig. 8.

Upon the application of nonidentical corresponding input signals, one or the other of bistable elements 922 or 923 will be set to the other of its stable states, depending upon the state the bistable elements were in prior to the application of the nonidentical digit signals, and the sense of the nonidentical digits. For example, if both bistable elements are in their "0" state and the applied nonidentity is an A, $\bar{B}$ nonidentity, corresponding to "1" and "0" digit signals from input signal sources 910 and 911, network 930 will produce an output signal, setting bistable element 922 to its "1" state. None of the remaining networks will produce an output signal since none receives corresponding "1" input signals. The response of the comparator to nonidentical digit signals in the opposite sense, or when bistable elements 922 and 923 were previously in their "1" state may be determined in a similar manner. Insofar as the setting of the bistable elements are concerned, the response of the comparator will be found to correspond to that shown in Fig. 8.

Once bistable elements 922 and 923 have been set to nonidentical states, they will not thereafter be changed from such setting, since the two networks which would have to produce output signals in order that the setting be changed will thereafter be receiving "0" input signals from the associated bistable element. On the other hand, the two networks corresponding to the setting of the bistable elements in their nonidentical states will continue to receive "1" input signals from the associated bistable elements. However, the output signals from the networks, if the application of further input signals is not discontinued, will not change the nonidentical setting of the bistable elements. The logical networks therefore, effectively inhibit the response of the bistable elements to further application of input signals once nonidentical input signals are applied.

The comparator shown in Fig. 9 and designated as a whole by the numeral 900 may also be used to carry out the comparison of two weighted binary numbers A and B by applying appropriate input signals. For example, Fig. 10 is a block diagram of a comparator according to this invention which may be used when the weighted binary digit signals are available in complementary form, in the order of most significant digit first, while the comparator shown in Fig. 11 may be used when the weighted binary digit signals are not available in complementary form.

Figure 10:
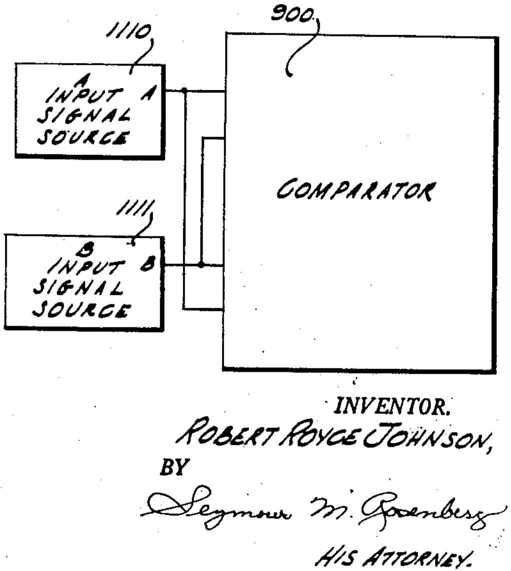

Referring now to Fig. 10, the comparator includes input signal sources 1010 and 1011 for supplying signals A, $\bar{A}$ and B, $\bar{B}$ representing, in complementary form, the successive digits of first and second numbers to be compared, respectively, and a comparator 900 identical to the embodiment shown in Fig. 9. Input signal source 1010 applies its A output signal to logical network 930 and its $\bar{A}$ output signal to logical network 931, while input signal source 1011 applies its B output signal to logical network 932 and its $\bar{B}$ output signal to logical network 933.

Since the basic comparator of Fig. 10 is identical to that of Fig. 9 the response of the comparator to applied input signals is identical. However, because the signals have a different significance the interpretation of the response of the comparator is different from that of Fig. 9. For example, so long as the input signals supplied by sources 1010 and 1011 are identical bistable elements 925 and 926 will be set to identical states by the applied input signals. The states to which bistable elements 925 and 926 are set will, however, correspond to the input signals applied from sources 1010 and 1011, respectively.

Upon the occurrence of nonidentical digit signals, however, the bistable elements will be set to nonidentical states. As has been discussed previously in connection with the embodiment of the invention shown in Fig. 9, once bistable elements 922 and 923 are set to nonidentical states they will not thereafter be changed from that setting and, accordingly, will store the first occurring nonidentical digit signals. Bistable element 914 will directly indicate the sense of this nonidentity and, as has been previously discussed in connection with the weighted binary code, this indication may be interpreted as an indication of the relative magnitudes of the two numbers. For example, if bistable element 914 is originally set to its "0" state and is not thereafter set to its "1" state by the comparison operation, the two numbers A and B are either identical or nonidentical in the sense $A \leqslant B$.

Figure 11:
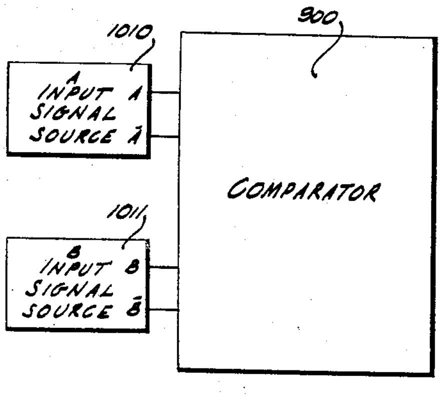
Figures 10 and 11 are block diagrams of the comparator shown in Figure 9, illustrating the use of the comparator to compare two weighted binary numbers, most significant digits first.

As set forth above, where the weighted binary digit signals are not available in complementary form the comparator shown in Fig. 9 may still be used to carry out the comparison operation by appropriate alteration of the applied input signals. There is shown in Fig. 11 a comparator according to the present invention which provides for the comparison of two weighted binary numbers A and B wherein signals representing the respective two numbers are applied to the system in the order most significant digit signal first. As shown in Fig. 11, the comparator includes input signal sources 1110 and 1111 for supplying signals A and B representing, respectively, the successive digits of first and second numbers to be compared and a comparator 900 identical to that shown in Fig. 9. Input signal source 1110 applies its A output signal to logical networks 930 and 933 while input signal source 1111 applies its B output signal to logical networks 931 and 932.

Since the basic comparator of Fig. 11 is identical to that of Fig. 9, the responses of the comparator to applied input signals is identical. Consider, however, the response of the comparator where the significance of the applied input signals is as set forth above. Initially all of the bistable elements are set to their "0" states, and in response to identical "0" digit signals, no change will take place within the comparator. If identical "1" digit signals are applied to the comparator and both bistable elements were previously in their "1" stable states, networks 931 and 933 will produce "1" output signals and thereby set bistable elements 922 and 923 to their "0" states. In a similar manner, if bistable elements 922 and 923 are in their "0" states the application of corresponding "1" digit signals from sources 1110 and 1111 will cause networks 930 and 932 to produce "1" output signals thereby setting the bistable elements to their "1" states. Accordingly, so long as the applied input signals are identical, the application of corresponding "0" input signals will produce no response in the system while the application of corresponding "1" digit signals causes each of bistable elements 922 and 923 to change from one to the other of its stable states.

Consider now the response of the comparator of Fig. 11 to the application of nonidentical corresponding digit signals. If both bistable elements 922 and 923 are in their "0" states, only networks 930 and 932 will receive "1" input signals from the output terminals of the associated bistable elements, and will thus produce "1" output signals if "1" input signals are applied to the other of their input terminals. If the applied input signals are nonidentical in the sense $A\bar{B}$, corresponding to a "1" digit signal for source 1110 and a "0" digit signal for source 1111. only network 930 will operate to set bistable element 922 to its "1" state. If, however, the applied input signals are nonidentical in the sense $\bar{A}$ B, network 932 will operate to set bistable element 923 to its "1" state. In either case, it will be seen that the final setting of bistable elements 922 and 923 will correspond to the sense of the nonidentity of the applied nonidentical digit signals, the setting of bistable element 922 corresponding to the digit signal supplied by source 1110 while the setting of bistable element 923 corresponds to the digit signal supplied by source 1111.

Similarly, had the bistable elements been in their "1" states previous to the application of the nonidentical digit signals, it can be shown that the bistable element whose associated source produced the "0" output signal of the nonidentical digit pair would be set to its "0" state, the other bistable element remaining in its "1" state.

It has previously been pointed out that once bistable elements 922 and 923 are set to nonidentical states, the response of the comparator to the application of further input signals is effectively inhibited. The interpretation of the information stored in the bistable elements by means of bistable element 914 and the response of this element once nonidentical digits have been applied to the comparator are identical to those discussed in connection with the embodiment of the invention shown in Fig. 9.

What is claimed as new is:

1. A substantially delay-free electronic magnitude comparator for comparing and instantaneously indicating the relative magnitudes of first and second binary numbers, said comparator comprising: first means for producing a first series of bi-valued electrical digit signals representing, respectively, the digits of the first number; second means for producing a second series of bi-valued electrical signals representing, respectively, the digits of the second number; a bistable electronic element; a source of clock pulses; third means responsive solely to the simultaneous application of said clock pulses and said signals for setting said bistable electronic element to one of its stable states when corresponding digit signals of the two numbers being compared are dissimilar in one sense; and fourth means responsive solely to the simultaneous application of said clock pulses and said signals for setting said bistable electronic element to the other of its stable states when corresponding digit signals of the two numbers being compared are dissimilar in the opposite sense.

2. The comparator defined in claim 1, wherein said first and second series of signals represent the first and second numbers, respectively, according to a weighted binary code.

3. The comparator defined in claim 1, wherein each of said first and second means produces its respective signals in time sequence in the order of least significant digit signal first.

4. The comparator defined in claim 1, wherein said digit signals are produced in time sequence in the order of most significant digit signal first, and including means for inhibiting the response of said third and fourth means following the occurrence of a non-identity in either sense between corresponding digit signals.

5. The comparator defined in claim 2, wherein said first and second series of signals represent the first and second numbers, respectively, according to a reflected binary code, said first and second means and said bistable electronic element being responsive to said signals and said clock pulses to change the setting of said bistable electronic element when corresponding digit signals of the two numbers being compared are dissimilar in the opposite sense.

6. The comparator defined in claim 5, wherein said binary digit signals are supplied in time sequence in the order of most significant digit signal first, and including fifth means for inhibiting said third and fourth means following the occurrence of a non-identity between corresponding digit signals having the greatest significance.

7. An electronic magnitude comparator for comparing and indicating the relative magnitudes of first and second binary numbers having first and second pluralities of corresponding groups of binary digits, respectively, said comparator comprising: a first signal source for producing in time sequence a first plurality of groups of binary electrical digit signals corresponding respectively to the first plurality of groups of digits; a second signal source for producing in corresponding time sequence a second plurality of groups of binary electrical digit signals corresponding respectively to the second plurality of groups of digits; an electronic element having two stable states; first logical gating means responsive to said signals to set said electronic element to one of its stable states when the highest order dissimilar corresponding digits have one relative magnitude; and second logical gating means responsive to said signals to set said electronic element to the other of its stable states when the highest order dissimilar corresponding digits have the opposite relative magnitude.

8. An electronic magnitude comparator for comparing and indicating the relative magnitudes of first and second reflected binary numbers repreesnted by first and second sets of bivalued electrical digit signals, respectively, each set including one signal for each digit of the number represented, said signals being supplied in the order of most significant digit signals first, corresponding digit signals at the same time; said comparator comprising: first, second and third bistable elements; first means for setting said bistable elements to the same stable state; second means, responsive to each signal of said first set having one predetermined value, to change the stable state of said first bistable element; third means, responsive to each signal of said second set having said one predetermined value, to change the stable state of said second bistable element; fourth means for setting said third bistable element to a state indicative of the sense of the nonidentity between said first and second bistable elements when said first and second bistable elements are in nonidentical states; and fifth means for inhibiting the response of said second and third means when said first and second bistable elements are in nonidentical states.

9. An electronic magnitude comparator for comparing and indicating the relative magnitudes of first and second reflected binary numbers represented by first and second sets of bivalued electrical digit signals, respectively, each set including one signal for each digit of the number represented, said signals being supplied in the order of most significant digit signals first, corresponding digit signals at the same time, said comparator comprising: first and second bistable elements; first means for setting said bistable elements to the same stable state; second means responsive to each signal of said first set having one predetermined value, to change the stable state of said first bistable element; third means, responsive to each signal of said second set having one predetermined value, to change the stable state of said second bistable element; and fourth means for inhibiting the response of said second and third means when said first and second bistable elements are in nonidentical states.

10. An electronic magnitude comparator for comparing and indicating the relative magnitudes of two reflected binary numbers represented by first and second sets of bivalued electrical digit signals, respectively, each set including one signal for each digit of the number represented, said signals being supplied in the order of most significant digit signals first, corresponding digit signals at the same time, said comparator comprising: a bistable element; first means for setting said bistable element to a predetermined one of its stable states; second means, responsive to each signal of said first set having one predetermined value, to change the stable state of said bistable element; and third means responsive to nonidentical corresponding digit signals to inhibit the response of said second means to succeeding digit signals.

11. The comparator defined in claim 10, wherein said third means includes a bistable element.

12. The comparator defined in claim 11, wherein said third means further includes means responsive to each signal of said second set having said one predetermined value to change the stable state of the last named bistable element.

13. An electronic magnitude comparator for comparing and indicating the relative magnitudes of two weighted binary numbers represented by two sets of bivalued electrical digit signals, respectively, each set including one signal for each digit of the number represented, said digit signals being supplied in the order of most significant digit signals first, corresponding digit signals at the same time; said comparator comprising: a bistable element; first means for setting said bistable element to a predetermined one of its stable states; second means responsive to a nonidentity in one sense between corresponding digit signals to set said bistable element to the other of its stable states; and third means responsive to a nonidentity in the other sense between corresponding digit signals for rendering said second means nonresponsive to said digit signals.

14. In an electronic comparator for comparing and indicating the relative magnitudes of two binary numbers represented by first and second sets of complementary bivalued electrical digit signals, A, $\bar{A}$, and B, $\bar{B}$, respectively, each set including one signal for each digit of the number represented, said signals being supplied in the order of most significant digit signals first, corresponding digit signals at the same time, the combination comprising: first, second, and third bistable elements, each having first and second input terminals and being responsive to signals applied to said first and second input terminals to set to first and second stable states, respectively, and to the simultaneous application of signals to said first and second input terminals to change from one to the other of its stable states; first means for applying a signal to said second input terminals to set said bistable elements to said second states; second and third means for applying input signals to said first input terminals of said first and second bistable elements, respectively, when said second and first bistable elements, respectively, are in said second stable state; fourth and fifth means for applying input signals to said second input terminals of said first and second bistable elements, respectively when said second and first bistable elements, respectively, are in said first stable state; and sixth means for applying a signal to said first input terminal of said third bistable element when said first and second bistable elements are set to states nonidentical in one sense.

15. The combination set forth in claim 14, including seventh means for applying signal set A to said second and third means, and eighth means for applying signal set B to said fourth and fifth means.

16. The combination set forth in claim 14, including further means for applying signal sets A, $\bar{A}$, B, and $\bar{B}$, respectively, to said second, third, fourth and fifth means.

17. The combination set forth in claim 14, including further means for applying signal set A to said second and fifth means, and signal set B to said third and fourth means.

References Cited in the file of this patent

UNITED STATES PATENTS

| | | |
|---|---|---|
| 2,590,950 | Eckert et al. | Apr. 1, 1952 |
| 2,600,744 | Eckert et al. | June 17, 1952 |
| 2,646,501 | Eckert et al. | July 21, 1953 |
| 2,655,598 | Eckert et al. | Oct. 13, 1953 |
| 2,673,293 | Eckert et al. | Mar. 23, 1954 |
| 2,712,898 | Knutsen | July 12, 1955 |
| 2,776,418 | Townsend | Jan. 1, 1957 |
| 2,821,696 | Shiowitz et al. | Jan. 28, 1958 |
| 2,844,309 | Ayres | July 22, 1958 |

FOREIGN PATENTS

| | | |
|---|---|---|
| 1,040,913 | France | May 27, 1953 |

UNITED STATES PATENT OFFICE

Certificate of Correction

Patent No. 2,900,620 August 18, 1959

Robert Royce Johnson

It is hereby certified that error appears in the printed specification of the above numbered patent requiring correction and that the said Letters Patent should read as corrected below.

Column 1, line 23, for "members" read —numbers—; column 6, line 6, for "$+ \ldots (A_nB_n+\bar{A}_n\bar{B}_n)$" read — $+ \ldots + (A_nB_n+\bar{A}_n\bar{B}_n)$ —;

column 8, line 8, for "$X+Y=\bar{X}Y$" read —$X+Y=X+\bar{X}Y$—; line 31, after the closing bracket and before "$\bar{A}_1+B_1)$" insert an opening parenthesis; line 32, for the second parenthetical expression "$(A_2B_2)$" read —$(\bar{A}_2B_2)$—; column 10, line 66, after "$\bar{K}_3\bar{K}_2)$" for "$\bar{J}_1$" read —$J_1$—; line 74, left-hand expression, for "$AB+\overline{AB})=$" read — $(AB+\overline{AB})=$ —;

column 13, line 29, after "$(A_2B_2+\bar{A}_2\bar{B}_2)$" for "$\bar{A}_3\bar{B}_3$" read —$A_3B_3$—; column 14, line 75, for "$A_1B_1$" read —$\overline{A_1\bar{B}_1}$—; column 19, line 49, beginning with "$A_3B_3+$" strike out all to and including "$)A_1$" in line 50, same column, and insert instead $$A_3\bar{B}_3(B_2A_1+\bar{A}_2\bar{A}_1+\bar{B}_2A_1+A_2\bar{A}_1)+A_3B_3B_2A_1+A_3B_3\bar{A}_2\bar{A}_1+\bar{A}_3\bar{B}_3\bar{B}_2A_1+\bar{A}_3\bar{B}_3A_2\bar{A}_1;$$

column 21, line 19, for "and" read —an—; line 67, second line of Equation (49), after the plus sign, second occurrence, insert an opening parenthesis; column 22, line 20, fourth line of Equation (52), for "$+A_3(A_2B_2$" read —$+\bar{A}_3(A_2B_2$—; line 21, fifth line of Equation (52), extreme left-hand portion, before "$\bar{A}_2\bar{B}_2)+$" insert a plus sign; line 32, fourth line of Equation (53), extreme left-hand portion, for "$+A_2A_3$" read —$+\bar{A}_2A_3$—; line 70, extreme right-hand expression, for "$+\bar{A}_1B_1$" read —$+\bar{A}_1B_1)$—; column 25, line 31, Equation (56), first expression of the second line, for "$+\bar{A}_1\bar{B}_1A_2B_2\bar{A}_3\bar{B}_3+$" read — $+A_1B_1A_2B_2\bar{A}_3\bar{B}_3+$ —;

column 31, line 41, for "1111." read —1111,—; column 32, line 67, for "represented" read —represented—.

Signed and sealed this 26th day of April 1960.

[SEAL]

Attest:

KARL H. AXLINE,
*Attesting Officer.*

ROBERT C. WATSON,
*Commissioner of Patents.*